US012750287B2

(12) United States Patent
Hakala et al.

(10) Patent No.: US 12,750,287 B2
(45) Date of Patent: Sep. 29, 2026

(54) SECURITY SERVICE ORCHESTRATION FUNCTION IN A SERVICE-BASED ARCHITECTURE

(71) Applicant: Telefonaktiebolaget LM Ericsson (publ), Stockholm (SE)

(72) Inventors: Harri Hakala, Turku (FI); Ari Pietikäinen, Espoo (FI); Anu Puhakainen, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 290 days.

(21) Appl. No.: 18/574,850

(22) PCT Filed: Jul. 7, 2021

(86) PCT No.: PCT/EP2021/068808

§ 371 (c)(1),
(2) Date: Dec. 28, 2023

(87) PCT Pub. No.: WO2023/280397

PCT Pub. Date: Jan. 12, 2023

(65) Prior Publication Data

US 2024/0323103 A1 Sep. 26, 2024

(51) Int. Cl.
*H04L 41/5006* (2022.01)
*H04L 41/5009* (2022.01)

(52) U.S. Cl.
CPC ...... *H04L 41/5006* (2013.01); *H04L 41/5009* (2013.01)

(58) Field of Classification Search
CPC ............. H04L 41/5006; H04L 41/5009; H04L 41/5032; H04L 63/20
See application file for complete search history.

(56) References Cited

U.S. PATENT DOCUMENTS

2014/0108639 A1 4/2014 Nelke et al.
2019/0141536 A1 5/2019 Bachmutsky et al.
(Continued)

FOREIGN PATENT DOCUMENTS

WO 2017164784 A1 9/2017
WO 2020049212 A1 3/2020
(Continued)

OTHER PUBLICATIONS

International Search Report and Written Opinion of the International Searching Authority, PCT/EP2021/068808, mailed May 3, 2022, 44 pages.
(Continued)

*Primary Examiner* — Joe Chacko
(74) *Attorney, Agent, or Firm* — Sage Patent Group

(57) ABSTRACT

A method is implemented by a security service orchestration function (SSOF) in a communication infrastructure, that includes a plurality of PLMNs and a plurality of enterprises, for orchestration of a security service level agreement (S-SLA). The method includes receiving, by a SSOF in a HPLMN, a S-SLA request from one or more of the enterprises. Each S-SLA request includes a plurality of requirements. The HPLMN corresponds to one of the plurality of PLMNs. The method also includes converting each S-SLA request into a consistent and unified S-SLA offerable to each enterprise. The consistent and unified S-SLA includes security attributes that the HPLMN is capable of providing. The method also includes offering the consistent and unified S-SLA to each enterprise that submitted the S-SLA request. The method further includes transforming each S-SLA request from the enterprises into security policies and controls to be enforced within the HPLMN.

19 Claims, 17 Drawing Sheets

(56) References Cited

U.S. PATENT DOCUMENTS

| | | | |
|---|---|---|---|
| 2020/0344267 A1 | 10/2020 | Adam et al. | |
| 2021/0203570 A9* | 7/2021 | Joshi | G06Q 30/0611 |
| 2021/0321303 A1* | 10/2021 | Nair | H04W 8/12 |

FOREIGN PATENT DOCUMENTS

| | | |
|---|---|---|
| WO | 2023280396 A1 | 1/2023 |
| WO | 2023280398 A1 | 1/2023 |

OTHER PUBLICATIONS

Trapero, Ruben et al., "A novel approach to manage cloud security SLA incidents," Future Generation Computer Systems, vol. 72, Jul. 1, 2017, 13 pages.

Jaatun, Martin Gilje et al., "Security SLAs—An Idea Whose Time has Come?" (Aug. 20, 2012), Advances in Biometrics: International Conference, ICB 2007, Seoul, Korea, Aug. 27-29, 2007, Proceedings, 8 pages.

3GPP TS 23.501 V16.0.0 (Mar. 2019); 3rd Generation Partnership Project; Technical Specification Group Services and System Aspects; System Architecture for the 5G System; Stage 2 (Release 16), 318 pages.

3GPP TS 33.501 V16.0.0 (Sep. 2019); 3rd Generation Partnership Project; Technical Specification Group Services and System Aspects; Security architecture and procedures for 5G System (Release 16), 196 pages.

NIS Cooperation Group, "EU coordinated risk assessment of the cybersecurity of 5G networks," Report Oct. 9, 2019, 33 pages.

3GPP TS 23.501 V16.9.0 (Jun. 2021); 3rd Generation Partnership Project; Technical Specification Group Services and System Aspects; System Architecture for the 5G System; Stage 2 (Release 16), 452 pages.

3GPP TS 28.500 V16.0.0 (Jul. 2020); 3rd Generation Partnership Project; Technical Specification Group Services and System Aspects; Telecommunication management; Management concept, architecture and requirements for mobile networks that include virtualized network functions (Release 16), 27 pages.

3GPP TS 33.501 V16.7.1 (Jun. 2021); 3rd Generation Partnership Project; Technical Specification Group Services and System Aspects; Security architecture and procedures for 5G System (Release 16), 255 pages.

ETSI GS NFV-MAN 001 V1.1.1 (Dec. 2014); European Telecommunications Standards Institute; Group Specification; Network Functions Virtualisation (NFV); Management and Orchestration; 184 pages.

International Preliminary Report on Patentability of the International Preliminary Examining Authority, PCT/EP2021/068808, dated Aug. 22, 2023, 45 pages.

* cited by examiner

SECURITY SERVICE ORCHESTRATION FUNCTION IN A SERVICE-BASED ARCHITECTURE

TECHNICAL FIELD

The present disclosure relates generally to security orchestration and management communications, and more particularly to methods and devices for a security service orchestration function in a service-based architecture (SBA).

BACKGROUND

Current 3rd Generation Partnership Project (3GPP) system architecture for the 5th Generation (5G) System, 3GPP TS 23.501, defines support for data connectivity and services enabling deployments to use techniques such as, e.g., Network Function Virtualization (NFV) and Software Defined Networking (SDN). The 5G architecture is defined as service-based interactions between network functions. 3GPP security architecture and procedures for the 5G system, 3GPP TS 33.501, specifies the security features and the security mechanisms for the 5G System and the 5G Core, and the security procedures performed within the 5G System. Security orchestration and management are left outside the scope in both 3GPP TS 23.501 and TS 33.501. 3GPP standardization does not deal with security concerns related to the deployment, configuration, or continuous operations of the technology. Secure orchestration and management of virtualization, general forms of security management (e.g., monitoring) are fundamental for telecom networks in 5G and beyond to operate robustly. Since there are no specifications for security management and orchestration interfaces in 3GPP, vendor-specific, non-standard interfaces may appear which makes interoperability difficult, unstable, risky, and costly.

Users of telecommunication services are facing an increasing number of security and privacy threats against their data and services. Without visibility to the security posture and protective measures provided to them by communication service providers, it is difficult to judge in reliable and repeatable manner if their expectations on security service levels are met and if there is need for additional mitigation of security risks.

Generic Service Level Agreements do not necessarily include security aspects. Even if defined, the definitions are static and often ambiguous. There is no transparency of the security posture provided by communication service providers (CSPs) or public land mobile networks (PLMNs) so an enterprise or end user cannot properly assess the risks associated with the utilization of a CSP's or PLMN's services. The same transparency is lacking between CSPs or PLMNs.

Current solutions have the following shortcomings:

1. It is not possible for the telecommunication service users, e.g., enterprises, to place dynamic security requirements to the CSPs or PLMNs.
2. It is not possible for the CSPs or PLMNs to pass users' dynamic security requirements to other CSPs or PLMNs, e.g., roaming partners, (even if such requirements would exist).
3. It is not possible for the CSP or PLMN to dynamically perform security capability mapping and optimization.
4. It is not possible for the CSPs or PLMNs to monitor their partners' compliance to users' dynamic security requirements, (even if such requirements would exist).

5. It is not possible for the CSPs or PLMNs to report their own compliance towards the users' dynamic security requirements, (even if such requirements would exist).

The following related issues can be identified particularly with the current 3GPP System architecture for the 5G system:

1 Security in a service-based architecture (SBA) is unconnected from other network functions, that is, there are no security orchestration capabilities or reference points towards various network functions and network entities.

2. There is no end-to-end security orchestration for SBA services that are distributed between several domains or Public Land Mobile Networks (PLMNs)
3. 3GPP specified network functions have limited capabilities in terms of providing, exposing, and negotiating security information.
4. In today's solutions security and privacy information is transferred and processed as part of standard service orchestration which implies security risks and isolation challenges (defense in depth).
5. Current information exchange between PLMNs is based on roaming agreements which focus delivering legacy voice and mobile data for the visiting subscribers and the respective billing information. These agreements are static, not dynamic or updated regularly. There is no mechanism in roaming agreements to handshake what kind of security and privacy levels are acceptable for the visiting subscribers with regard to 5G services and network slicing. There is no mechanism in roaming agreements to specify and transfer security and privacy related attributes and to interexchange security and privacy related information between roaming partners.

6 Current service level agreements (operator-operator, operator-enterprise) are based on performance objectives related to availability and reliability. In few cases when security is taken into consideration, security is still a non-negotiable, meaning there is no possibility to acquire a service with specific security characteristics.

7. No current practice exists on how an enterprise (service user) or CSP (PLMN) can monitor and audit in real time security attributes related to their offered service, especially in roaming situations, in order to have a guarantee of security and privacy of the service, or to require updates to security levels of the service.

SUMMARY

According to some embodiments of inventive concepts, a security service orchestration function (SSOF) in a communication infrastructure provides capabilities for security orchestration for an information technology system in a standardized manner. In some examples, the communication infrastructure includes a plurality of PLMNs and a plurality of enterprises serving a plurality end-users. The SSOF enables submitting a security service level agreement (S-SLA) based requirements as security attributes from an enterprise to an operator or between operators in roaming situations through standardized interfaces and reference points. The SSOF negotiates and coordinates the necessary security attributes and their associated levels or strengths between enterprises in a HPLMN and converts the different enterprise S-SLA requirements into a consistent and unified S-SLA offered to enterprises in the HPLMN. The HPLMN or SSOF of the HPLMN negotiates with different VPLMNs a security service level that can be achieved between the PLMNs in roaming situations, a S-SLA request is based on the HPLMN's own security policy and unified S-SLA the HPLMN wants to fulfill in roaming situations. As a result of the negotiation, there is mutual understanding for the agreed S-SLA between the HPLMN and VPLMNs in roaming situations. Based on that S-SLA, the HPLMN monitors and communicates the compliance status and compliance violations for S-SLA to the VPLMNs and enterprises.

According to some embodiments of inventive concepts, a method implemented by a security service orchestration function (SSOF) in a communication infrastructure, that includes a plurality of public land mobile networks (PLMNs) and a plurality of enterprises, for orchestration of a security service level agreement (S-SLA) includes receiving, by a SSOF in a home public land mobile network (HPLMN), a S-SLA request from one or more of the plurality of enterprises. Each S-SLA request includes a plurality of requirements. The HPLMN corresponds to one of the plurality of PLMNs. The method also includes converting each S-SLA request into a consistent and unified S-SLA offerable to each enterprise. The consistent and unified S-SLA includes security attributes that the HPLMN is capable of providing each of the enterprises. The method also includes offering the consistent and unified S-SLA to each enterprise that submitted the S-SLA request. The method also includes transforming each S-SLA request from the one or more enterprises into security policies and controls to be enforced within the HPLMN.

According to some embodiments of inventive concepts, a computing device includes processing circuitry and a memory coupled with the processing circuitry. The memory includes instructions that when executed by the processing circuitry causes the computing device to receive, by a SSOF in a home public land mobile network (HPLMN), a S-SLA request from one or more of a plurality of enterprises. Each S-SLA request includes a plurality of requirements. The memory also includes instructions that when executed by the processing circuitry causes the computing device to convert each S-SLA request into a consistent and unified S-SLA offerable to each enterprise. The consistent and unified S-SLA includes security attributes that the HPLMN is capable of providing each of the enterprises. The memory also includes instructions that when executed by the processing circuitry causes the computing device to offer the consistent and unified S-SLA to each enterprise that submitted the S-SLA request. The memory further includes instructions that when executed by the processing circuitry causes the computing device to transform each S-SLA request from the one or more enterprises into security policies and controls to be enforced within the HPLMN.

According to some embodiments of inventive concepts, a computing device is adapted to receive, by a SSOF in a home public land mobile network (HPLMN), a S-SLA request from one or more of a plurality of enterprises. Each S-SLA request includes a plurality of requirements. The computing device is also adapted to convert each S-SLA request into a consistent and unified S-SLA offerable to each enterprise. The consistent and unified S-SLA includes security attributes that the HPLMN is capable of providing each of the enterprises. The computing device is also adapted to offer the consistent and unified S-SLA to each enterprise that submitted the S-SLA request. The computing device is further adapted to transform each S-SLA request from the one or more enterprises into security policies and controls to be enforced within the HPLMN.

According to some embodiments of inventive concepts, a method is implemented by a security service orchestration function (SSOF) in a communication infrastructure, that includes a plurality of public land mobile networks (PLMNs) and a plurality of enterprises, for orchestration of a security service level agreement (S-SLA). The method includes receiving, by a SSOF in a visited public land mobile network (VPLMN), S-SLA requirements from a SSOF in a home public land mobile network (HPLMN). The method also includes transmitting, by the SSOF in the VPLMN, an initial S-SLA fulfillment level to the SSOF in the HPLMN in response to receiving the S-SLA requirements. The method also includes receiving a S-SLA compliance monitoring request from the SSOF in the HPLMN. The method further includes transmitting a S-SLA compliance status report to the SSOF in the HPLMN in response to receiving the S-SLA compliance monitoring request and/or in requested intervals.

According to some embodiments of inventive concepts, a computing device includes processing circuitry and a memory coupled with the processing circuitry. The memory includes instructions that when executed by the processing circuitry causes the computing device to receive, by a SSOF in a visited public land mobile network (VPLMN), S-SLA requirements from a SSOF in a home public land mobile network (HPLMN). The memory includes instructions that when executed by the processing circuitry causes the computing device to transmit, by the SSOF in the VPLMN, an initial S-SLA fulfillment level to the SSOF in the HPLMN in response to receiving the S-SLA requirements. The memory also includes instructions that when executed by the processing circuitry causes the computing device to receive a S-SLA compliance monitoring request from the SSOF in the HPLMN. The memory further includes instructions that when executed by the processing circuitry causes the computing device to transmit a S-SLA compliance status report to the SSOF in the HPLMN in response to receiving the S-SLA compliance monitoring request and/or in requested intervals.

According to some embodiments of inventive concepts, a computing device is adapted to receive, by a SSOF in a visited public land mobile network (VPLMN), S-SLA requirements from a SSOF in a home public land mobile network (HPLMN). The computing device is also adapted to transmit, by the SSOF in the VPLMN, an initial S-SLA fulfillment level to the SSOF in the HPLMN in response to receiving the S-SLA requirements. The computing device is also adapted to receive a S-SLA compliance monitoring request from the SSOF in the HPLMN. The computing device is further adapted to transmit a S-SLA compliance status report to the SSOF in the HPLMN in response to receiving the S-SLA compliance monitoring request and/or in requested intervals.

According to some embodiments of inventive concepts, a method is implemented by a security service orchestration function (SSOF) in a communication infrastructure, that includes a plurality of public land mobile networks (PLMNs) and a plurality of enterprises, for orchestration of a security service level agreement (S-SLA). The method includes transmitting, by a home public land mobile network (HPLMN) of the plurality of PLMNs, a S-SLA request to one or more visited public land mobile networks (VPLMNs) of the plurality of PLMNs to support specific business services with specific security attributes. The method also includes receiving a response from each VPLMN including a unique S-SLA including security attributes the VPLMN is capable of providing and based on the S-SLA request. The method further includes merging the security attributes received from each VPLMN into a common security baseline capability template S-SLA for communication to business services users or each of the enterprises.

According to some embodiments of inventive concepts, a method is implemented by a security service orchestration function (SSOF) in a communication infrastructure, that includes a plurality of public land mobile networks (PLMNs) and a plurality of enterprises, for orchestration of a security service level agreement (S-SLA). The method includes receiving, by a home public land mobile network (HPLMN) of the plurality of PLMNs, an enterprise S-SLA request from a requesting enterprise. The enterprise S-SLA request includes a specific level of security attributes the requesting enterprise wants fulfilled in roaming situations. The method also includes performing capability mapping between the security attributes in the enterprise S-SLA request and a common security baseline capability template S-SLA of the HPLMN. The common security baseline capability template S-SLA defines a common capability S-SLA offerable by the HPLMN. The method also includes offering the common capability S-SLA to the requesting enterprise for roaming situations in response to the common security baseline capability template S-SLA matching the security attributes in the enterprise S-SLA request. The method further includes receiving a response from the requesting enterprise. The response includes an acceptance or a decline of the common capability S-SLA.

According to some embodiments of inventive concepts, a computing device includes processing circuitry and a memory coupled with the processing circuitry. The memory includes instructions that when executed by the processing circuitry causes the computing device to receive, by a home public land mobile network (HPLMN) of a plurality of public land mobile networks (PLMNs), an enterprise S-SLA request from a requesting enterprise. The enterprise S-SLA request includes a specific level of security attributes the requesting enterprise wants fulfilled in roaming situations. The memory also includes instructions that when executed by the processing circuitry causes the computing device to perform capability mapping between the security attributes in the enterprise S-SLA request and a common security baseline capability template S-SLA of the HPLMN. The common security baseline capability template S-SLA defines a common capability S-SLA offerable by the HPLMN. The memory also includes instructions that when executed by the processing circuitry causes the computing device to offer the common capability S-SLA to the requesting enterprise for roaming situations in response to the common security baseline capability template S-SLA matching the security attributes in the enterprise S-SLA request. The memory further includes instructions that when executed by the processing circuitry causes the computing device to receive a response from the requesting enterprise. The response comprises an acceptance or a decline of the common capability S-SLA.

Certain embodiments may provide one or more of the following advantages:

- Ability to centrally orchestrate security capabilities and features in a 3GPP architecture for various network functions, network entities and services.
- Ability to request and provide common and consistent security attributes for 5G service-based architecture (SBA) and future generations network services in a coordinated way.
- Ability to collect, share and expose enhanced security information with other network functions.
- Separation and isolation of security orchestration from service orchestration contributes to defense in depth principles and latest progress visible in draft specifications.
- Ability to interchange and orchestrate security specific attributes as part of service level agreements between PLMNs through a standardized reference point or interface.
- Provides standardized interfaces and reference points for security service orchestration.
- Ability to perform dynamic and automated security capability mapping and optimization for roaming.
- Facilitates security service level handshake between a PLMN and enterprises and between PLMNs.
- Provide regular updates on run-time compliance information from VPLMN to HPLMN and from HPLMN to enterprise.

All the above advantages are applicable for 5G SBA and future generation networks. The proposed solution is applicable to privacy related orchestration in a similar way as for security orchestration.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
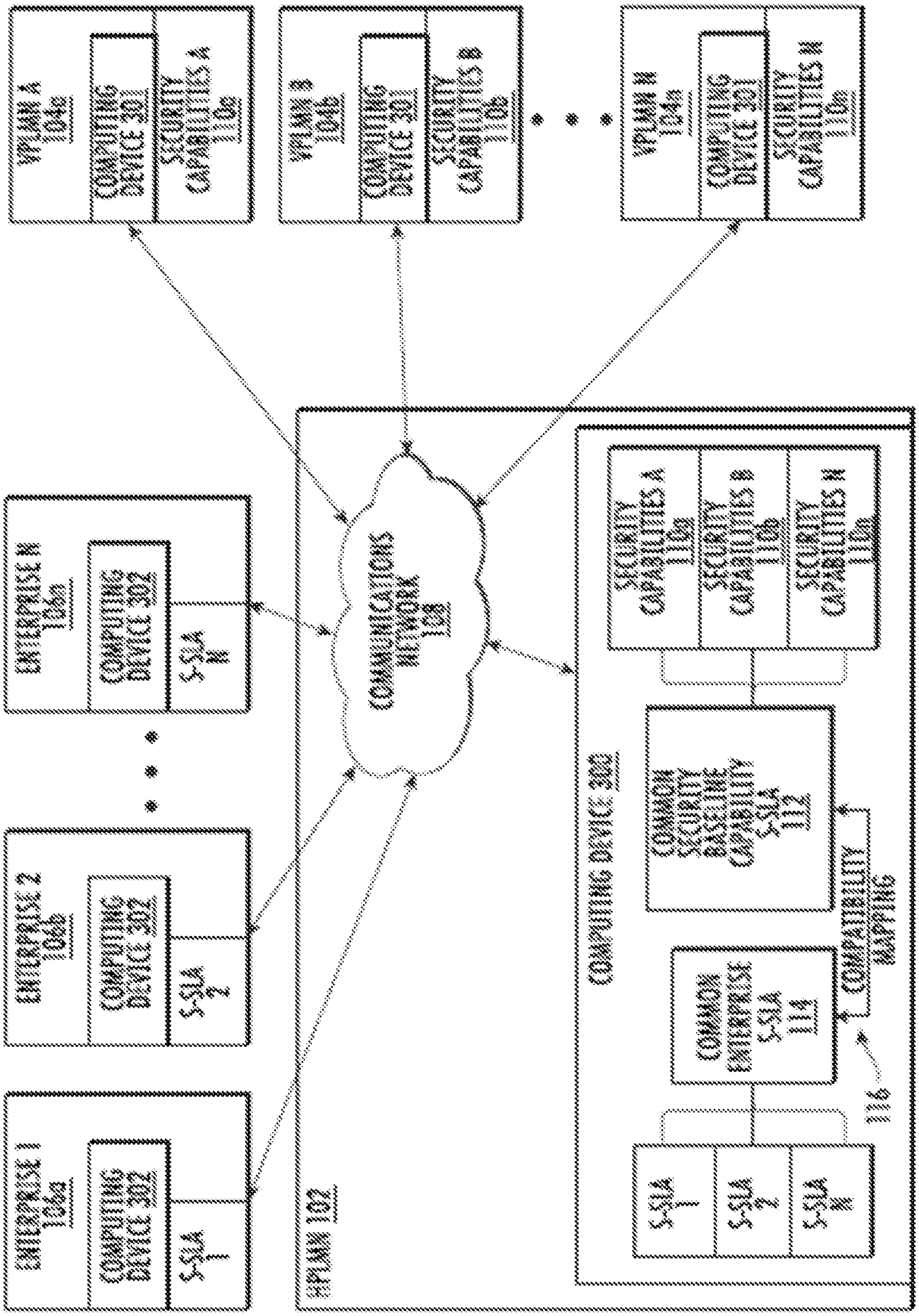
FIG. 1 is a block diagram of an example of a communication system including a security service level agreement (S-SLA) negotiation schema according to some embodiments of inventive concepts.
Figure 3:
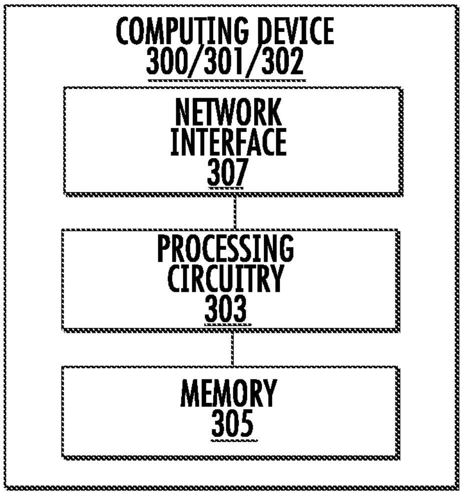
FIG. 3 is a block diagram of an example of a computing device according to some embodiments of inventive concepts.

FIG. 1 is a block diagram of an example of a communication system 100 including a security service level agreement (S-SLA) negotiation schema according to some embodiments of inventive concepts. Embodiments of the inventive concepts described herein are applicable to any communication system or information technology system based on network elements and appliances. The exemplary communication system 100 includes a plurality of public land mobile networks (PLMNs), e.g., a home public land mobile network (HPLMN) 102 and one or more visited public land mobile networks (VPLMNs) 104*a*-104*n*. The HPLMN 102 may also be referred to as a communications service provider (CSP) and the VPLMNs 104*a*-104*n* may also be referred to as CSPs, other CSPs or partner CSPs. The exemplary communication system 100 also includes a plurality of enterprises 106*a*-106*n* which may also be referred to an enterprise customers. As described in more detail herein, each of the VPLMNs 104*a*-104*n* include security capabilities 110*a*-110*n* that can be offered to other PLMNs, e.g., HPLMN 102. The HPLMN 102 and the VPLMNs 104*a*-104*n* communicate with one another via a communications network 108. The communications network 108 is any type of communications network, e.g., a wireless communications network, a wired communications network or combination wireless and wired communications network. In accordance with some examples, the HPLMN 102 includes a computing device 300 and each of the other VPLMNs include a computing device 301. In some examples, each of the enterprises include a computing device 302. An example of a computing device useable for any of the computing devices 300, 301 or 302 will be described with reference to FIG. 3. The HPLMN 102, each of the VPLMNs 104*a*-104*n* and each of the enterprises 106*a*-106*n* may include any type of computing devices or communications device including additional components and different types of components than those illustrated in the example in FIG. 3. The exemplary computing device 300, 301 or 302 illustrated in FIG. 3 is shown as including minimal generic components for performing the inventive concepts described herein.

Figure 2:
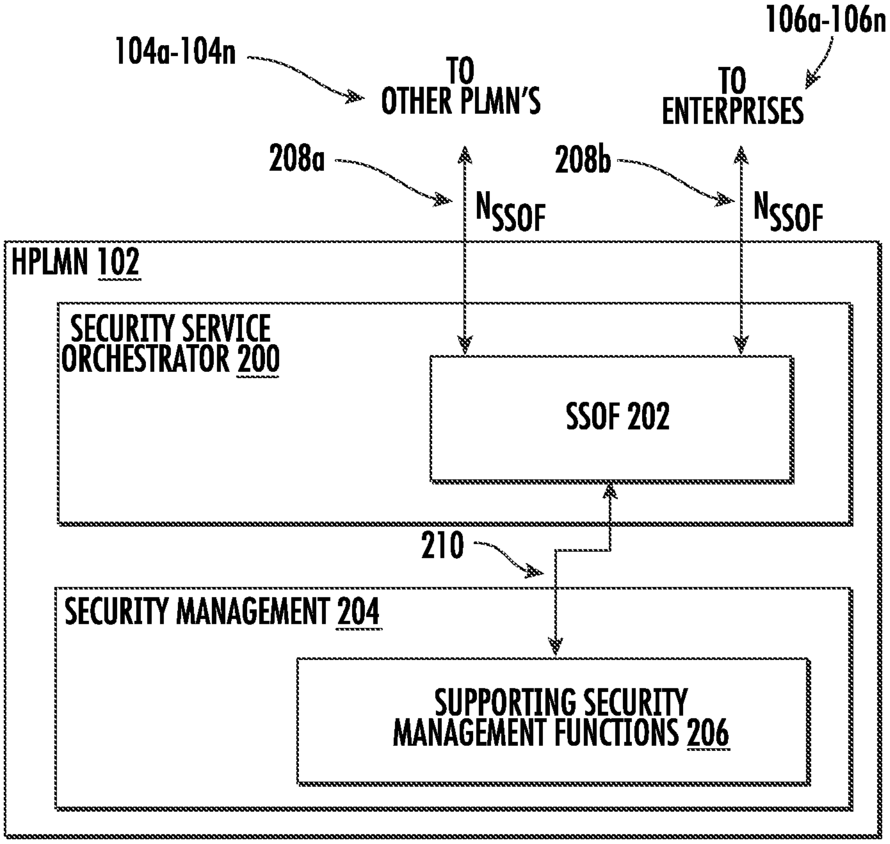
FIG. 2 is a block diagram of an example of a security service orchestrator and security management module according to some embodiments of inventive concepts.

Security service level agreement (S-SLA) enablement and enforcement in a 3GPP service-based architecture (SBA) is implemented as a Security Service Orchestrator Function (SSOF) 202 in FIG. 2. According to 5G system architecture principles, the SSOF 202 can interact directly with 3GPP network functions and network entities if required. The SSOF 202 supports interaction between PLMNs exchanging information on security policies to adhere to security service level agreements.

The 5G network is designed to be able to offer a different mix of capabilities to meet very diverse service requirements at the same time, meaning that security requirements for service may also be very different from industry to industry, service to service and per business customer, where the business customer could be an enterprise, specialized industry customer or individual consumers.

Global System for Mobile Communications Association (GSMA) for example, advertises that 5G networks, in combination with Network Slicing, provides business customers connectivity and data processing tailored to their specific business requirements. The network slice can be tailored based on the specific requirements adhering to a Service Level Agreement (SLA) agreed between (network slice) the customer and network slice provider, which is often a communications service provider (CSP), e.g., a HPLMN.

An issue with existing solutions including the network slicing is that enterprises are unable to place or submit (dynamic) security requirements to the CSP or PLMN and later monitor the compliance of how well these requirements are achieved by the CSP or PLMN. Additionally, CSPs or PLMNs are unable to pass their own or enterprise security requirements to other CSPs or PLMNs (roaming partners) and monitor the compliance of how well these requirements are achieved by the different roaming partners.

Accordingly, there is a need to have a well-defined standardized list of attributes that can characterize security for the network services, such as a network slice. These security attributes are negotiable between the CSP or PLMN and its enterprise customers.

Different enterprises have different security needs to protect their service, thus negotiable security attributes may vary depending on the enterprise and the industry segment the enterprise represents. For example, enterprises in public safety may have rather different security requirements to protect their services compared to for example, an enterprise in the automotive, energy, healthcare, or manufacturing industry.

Security protection of services may vary also whether the service is offered and delivered within a HPLMN of a CSP or if the service is offered within a VPLMN by another CSP when roaming. Negotiable security attributes can be categorized based on the main security principles: confidentiality, integrity, authentication and authorization, availability, added with separate categories for isolation, data sovereignty and mobile network operator (MNO) interworking. Enterprises can define in a negotiation phase what security attributes they want to include in their Security Service Level Agreements (S-SLA's) and whether they are applicable for services in their home network and for visiting networks in case of roaming. Attribute values, that is, strength of security protection may vary when a service is offered in the home or visiting network. Negotiable security attributes categories and examples of attributes values or strengths include:

Confidentiality attributes (C) ensure that the service is protected from unwanted information disclosure, e.g., packets/traffic are not possible of disclose outside the service and network slice. Different crypto algorithms and strength for those algorithms can be requested for roaming and non-roaming cases. Examples for confidentiality attributes that can be requested for the services include e.g., different strengths for Advanced Encryption Standard (AES): AES-128, AES-192, AES-256 and Triple Data Encryption Algorithm (TDES).

Integrity attributes (I) ensure that the service integrity can be preserved, e.g., packets/traffic in a slice are not tampered with or replaced without noticing. Different integrity algorithms and strength for those algorithms can be requested for roaming and non-roaming cases. Examples of integrity attributes that can be requested for the services include e.g., different strengths for Secure Hash Algorithms (SHA): SHA-2, SHA-3, SHAKE128, SHAKE256.

Authentication and authorization attributes (AA) ensure that only authorized persons, user accounts and network elements can interact with the service. Different authentication and authorization mechanisms for the service can be requested for roaming and non-roaming cases. Examples of authentication and authorization mechanisms include, e.g., multi-factor authentication for users, secondary authentication towards an AAA Server (AAA-S) which is hosted by a HPLMN operator or a trusted third party in order to access the specific Network Slice.

Non-repudiation attributes (NR) ensure the assurance that someone cannot deny something. Non-repudiation artifacts include: an identity, the authentication of that identity and tangible evidence connecting the identified party to a particular communication or action. Different non-repudiation mechanisms can be requested, for instance different digital signature algorithms such as RSA, DSA, ECDSA, RSA with SHA.

Availability attributes (A) ensure that the service and network functions providing the service remain accessible all the time for authorized users. Different availability mechanisms can be requested for roaming and non-roaming cases. Examples of availability mechanisms are extra security functions to be instantiated or activated, e.g., Physical Security Functions (PSF), Virtual Security Functions (VSF).

Isolation attributes (IS) ensure that the service resources are not shared among other network users or services, e.g., information transferred in each slice are not shared among other slices. Different isolation mechanism can be requested for roaming and non-roaming cases. Example of isolation mechanisms include service specific isolation to ensure none of the network resources are shared with other customers or enterprises.

Data sovereignty (DS) attributes ensure that the data always stays within specific jurisdictions. Different data sovereignty mechanisms can be requested for roaming and non-roaming cases. Example of data sovereignty attributes include, e.g., requesting allocation of network slice resources only from allowed IP domains, anonymization and pseudonymization of data if it is not possible to route the data traffic entirely within the specified jurisdictions. Data sovereignty attribute may also indicate that a data object should be dropped if data object is moving to a forbidden jurisdiction, or before the data object can be transfer to another jurisdiction, the data object is split into smaller parts.

MNO Interworking attributes ensure that a specific S-SLA is fulfilled between roaming PLMNs. Examples of interworking attributes exchanged between roaming partners include:

IP Address of IPsec gateway (GW) for Network Domain Security/Internet Protocol (NDS/IP) traffic between network security domains (exchanged over Za interfaces).

security parameters for an N32 interface between Security Edge Protection Proxies SEPP's of a VPLMN and a HPLMN in a roaming scenario when Stand Alone (SA) deployment is used.

IP address for an IPX provider in case of data roaming and signaling, e.g., Non-Stand Alone (NSA) deployment for LTE Diameter signaling or non-service-aware general-purpose connectivity for bilateral operator requirements.

Each enterprise **106*a*-106*n* has their own security intent and objectives which are driven by security risk evaluation and understanding. Each enterprise 106*a*-106*n*** translates this security risk evaluation and understanding into security attributes defined in their security service level agreement (S-SLA). For example, the S-SLA may include information as to what extent the enterprise tolerates variation in different security attributes and what measures are mandatory in order to achieve their desired protection level for non-roaming and roaming cases. Hence the attribute values, that is, strength of security protection may vary when service is offered in a home or visiting network.

The example in FIG. 1 illustrates Security Service Level Agreement (S-SLA) negotiation between home and visiting operators (HPLMN 102 and VPLMNs **104*a*-104*n*) and between an operator (HPLMN 102) and enterprises 106*a*-106*n*. FIG. 1** illustrates how PLMN specific unified enterprise security attributes are negotiated between PLMNs':

S-SLA negotiation between the HPLMN 102 and enterprises **106*a*-106*n* where CSP in HPLMN 102 converts different enterprise S-SLA requirements (S-SLA 1-S-SLA N) into a consistent unified S-SLA, e.g., common enterprise S-SLA 114 offered to the enterprises 106*a*-106*n***.

The HPLMN 102 negotiates with different VPLMNs **104*a*-104*n* (CSPs) the security service level that can be achieved between the VPLMNs 104*a*-104*n* or in roaming situations, or the security service level that each of the VPLMNs 104*a*-104*n* is capable of providing in roaming situations. The security service level request is based on HPLMN requirements. The HPLMN 102 creates, based on the capability information received from VPLMNs, a common security baseline capability template S-SLA 112**.

The HPLMN 102 has, based on its own security risk assessment and ambition level, its own network specific security requirements that are applied to the HPLMN network and services the HPLMN 102 offers.

As a result of the negotiations between the HPLMN 102 and the enterprises **106*a*-106*n* and the negotiations between the HPLMN 102 and the VPLMNs 104*a*-104*n*, the HPLMN 102 understands the security capabilities available from the different VPLMNs 104*a*-104*n* and on the other hand security capabilities required to provide services to the enterprises 106***a*-106*n* according to the S-SLA's 112 and 114. The HPLMN 102 perform security capability mapping or capability mapping 116 between the common security baseline capability template S-SLA 112 and the common enterprise S-SLA 114. Based on the capability mapping 116, the HPLMN 102 determines whether security requirements can be fulfilled with the common security baseline capability template S-SLA 112 or if there is need for a service specific S-SLA or service specific roaming S-SLA.

As a result, end-to-end compliance monitoring is performed for the HPLMN/VPLMN and enterprise S-SLA's.

FIG. 2 is a block diagram of an example of a security service orchestrator 200 and security management module 204 according to some embodiments of inventive concepts. In the example in FIG. 2, the security service orchestrator 200 includes the SSOF 202. Also, in the example in FIG. 2, the security service orchestrator 200 is shown as a component of the HPLMN 102. In other examples, the security service orchestrator 200 and/or SSOF 202 are a separate component associated with the HPLMN 102. In other examples, e.g., the example in FIG. 8, each VPLMN 104*a*-104*n* also includes a SSOF 202. The security management module 204 includes supporting security management functions 206. Examples of operations or functions of the supporting security management functions 206 will be described with reference to FIGS. 6 and 9. The SSOF 202 includes a northbound interface, Nssof reference point 208, used for S-SLA negotiation with the enterprises 106*a*-106*n* and other PLMNs or VPLMNs 104*a*-104*n* and exchanging information on S-SLA security attributes. As illustrated in the example in FIG. 2, the SSOF 202 includes an Nssof reference point 208*a* configured to interface with each VPLMN 104*a*-104*n* for negotiation and exchanging information on S-SLA security attributes and another Nssof reference point 208*b* configured to interface with each enterprise 106*a*-106*n* for negotiation and exchanging information on S-SLA security attributes. The SSOF 202 also includes a southbound interface 210 for interacting with the supporting security management functions 206. Information on the consistent and unified S-SLA or common enterprise S-SLA 110 and respective security attributes are transferred between the HPLMN 102 and the enterprises 106*a*-106*n* over the Nssof reference point.

208*b*. Information on the common security baseline capability template S-SLA 112 and respective security attributes are transferred between the HPLMN 102 and the VPLMNs 104*a*-104*n* over the Nssof reference point 208*a*. The Nssof reference point 208*a* includes interfaces Nssof_S-SLAOrchestrationCSP and Nssof_S-SLAComplianceCSP. The Nssof reference point 208*b* includes with interfaces Nssof_EnterpriseS-SLAOrchestration and Nssof_EnterpriseS-SLACompliance. The following NF services are specified for the SSOF 202 as illustrated in FIG. 2:

| Service name | Description |
|---|---|
| Nssof_EnterpriseS-SLAOrchestration | Used for being informed about the negotiable security attributes for non-roaming and roaming cases between Home Network Operator and Enterprises |
| Nssof_EnterpriseS-SLACompliance | Used for being informed about compliance status and compliance violations for the agreed security policies and attributes for roaming cases between Home Network Operator and Enterprises |

-continued

| Service name | Description |
|---|---|
| Nssof_S-SLAOrchestrationCSP | Used for being informed and to negotiate security attributes between HLPMN and VPLMN operators |
| Nssof_S-SLAComplianceCSP | Used for being informed about compliance status and compliance violations for the agreed security attributes for roaming case between HPLMN and VPLMN operators |

FIG. 3 is a block diagram of an example of a computing device according to some embodiments of inventive concepts. In accordance with some examples, as previously described, the HPLMN 102 includes a computing device 300 and each of the VPLMNs 104*a*-104*n* include a computing device 301. Additionally, in some examples, each of the enterprises 106*a*-106*n* include a computing device 302. In the example in FIG. 3, the computing devices 300, 301 and 302 are shown as being the same and including the same components; however, in other examples, the computing devices 300, 301 and 302 may include different components. The embodiment shown in FIG. 3 includes exemplary components for performing the inventive concepts described herein. The exemplary computing device 300, 301 or 302 includes processing circuitry 303, a memory 305 and a network interface circuitry 307. The processing circuitry 303 may control network interface circuitry 307 to transmit communications through network interface circuitry 307 to one or more network nodes of VPLMNs 104*a*-104*n* or enterprises 106*a*-106*n* in the example in FIG. 1 and/or to receive communications through the network interface circuitry 307 from one or more network nodes of VPLMNs 104*a*-104*n* or enterprises 106*a*-106*n* to perform the inventive concepts described herein. Moreover, modules may be stored in memory 305, and these modules may provide instructions so that when instructions of a module are executed by processing circuitry 303, processing circuitry 303 performs respective operations. In some examples, the memory 305 coupled with the processing circuitry 303 includes instructions that when executed by the processing circuitry 305 causes the computing device 300 or 301 to perform at least some of the functions of the methods described herein. In some examples, the methods described herein performed by the SSOF 202 and the supporting security management functions 206 are embodied in and performed by one or more computing devices that are the same or similar to computing device 300 or 301. For example, the SSOF 202 and the supporting security management function 206 are embodied on the same computing device 300 or 301 or separate computing devices 300 or 301.

Figure 4A:
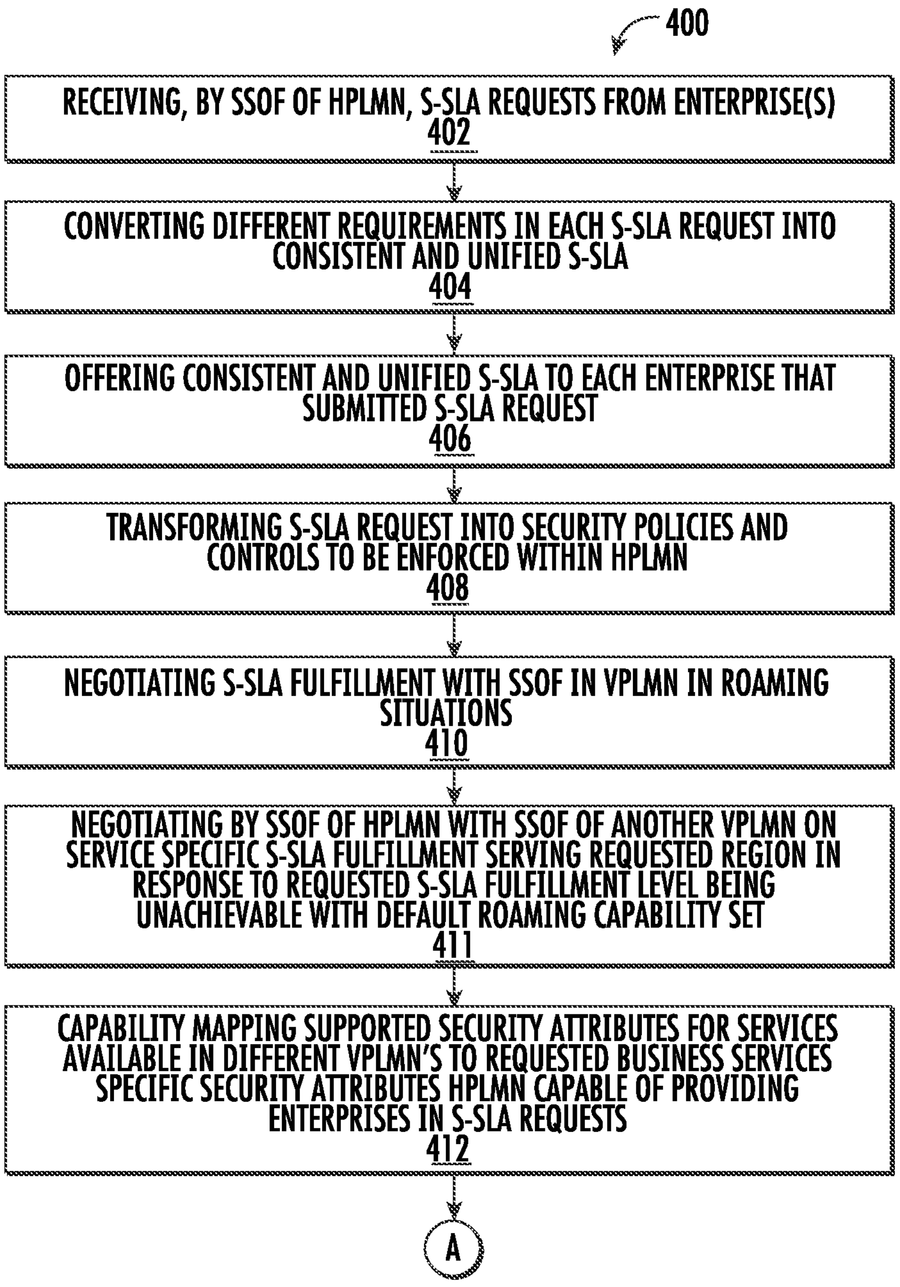
FIGS. 4A-4B are a flow chart of an example of a method of operation of a SSOF in a HPLMN according to some embodiments of inventive concepts.
Figure 4B:
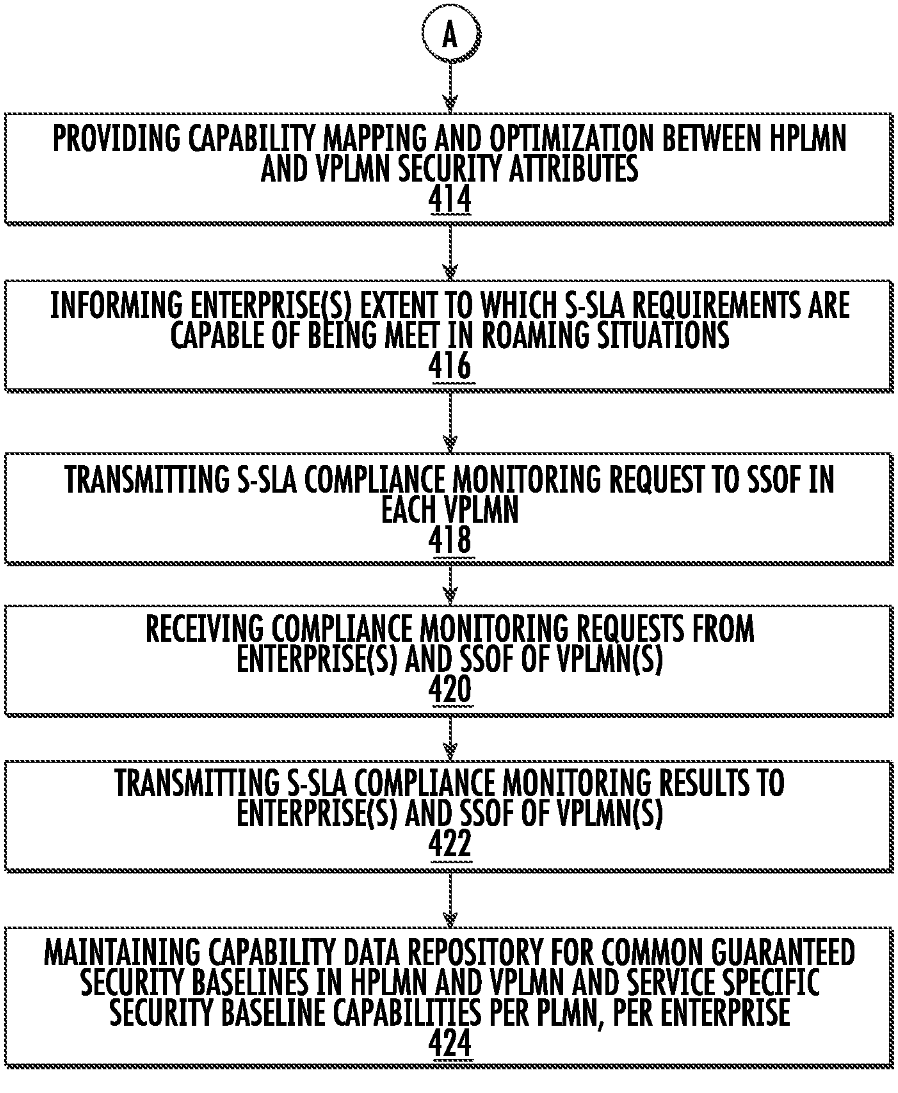

FIGS. 4A-4B are a flow chart of an example of a method 400 of operation of a SSOF in a HPLMN according to some embodiments of inventive concepts. The method 400 is implemented by a security service orchestration function (SSOF), such as SSOF 202 in FIG. 2, in a communication infrastructure, that includes a plurality of public land mobile networks (PLMNs), e.g., HPLMN 102 and VPLMNs 104*a*-104*n*, and a plurality of enterprises, e.g., 106*a*-106*n*, for orchestration of a security service level agreement (S-SLA), such as common enterprise S-SLA 114 and/or common security baseline capability template S-SLA 112. The Security Service Orchestration Function (SSOF) is the primary security orchestration function communicating with other PLMNs or VPLMNs 104*a*-104*n*, enterprises 106*a*-106*n* and other 3GPP network functions and network entities within the HLPMN 102 supporting security service level agreement negotiation based on the security attributes. The objective of the SSOF 202 is to ensure consistency of security policies in both non-roaming and roaming situations. The described mechanism can be applied to privacy attributes in a similar way. The method 400 includes the core functionality of an SSOF in a HPLMN, such as SSOF 202 in HPLMN 102, according to some embodiments of inventive concepts.

In block 402, the method 400 includes receiving, by a SSOF in a home public land mobile network (HPLMN), a S-SLA request from one or more of the plurality of enterprises. Each of the enterprises serves a plurality of end users. Each S-SLA request includes a plurality of requirements or enterprise S-SLA requirements. The HPLMN corresponds to one of a plurality of PLMNs. The S-SLA request from each enterprise may include different enterprise S-SLA requirements.

In block 404, the method 400 includes converting each S-SLA request including different enterprise S-SLA requirements into a consistent and unified S-SLA offerable to each enterprise. The consistent and unified S-SLA includes security attributes that the HPLMN is capable of providing each of the enterprises.

In block 406, the method 400 includes offering the consistent and unified S-SLA to each enterprise that submitted the S-SLA request.

In block 408, the method 400 includes transforming each S-SLA request from the one or more enterprises into security policies and controls to be enforced within the HPLMN.

In block 410, the method 400 includes negotiating, by the SSOF in the HPLMN, fulfillment of the consistent and unified S-SLA with a SSOF in a visited public land mobile network (VPLMN) in roaming situations.

In block 411, the method 400 includes negotiating, by the SSOF in the HPLMN with a SSOF in another VPLMN, service specific S-SLA fulfillment in response to a requested S-SLA fulfillment being unachievable with the consistent and unified S-SLA.

In block 412, the method 400 includes capability mapping of supported security attributes for business services available in different VPLMNs to requested business services specific security attributes that the HPLMN is capable of providing the enterprises in their S-SLA requests.

In block 414, the method 400 includes providing capability mapping and optimization between HPLMN and VPLMN security attributes. In some examples, optimization is based on the capability mapping where the highest possible common security attribute set between different VPLMNs and the HPLMN for the different services are agreed in advance in the negotiation without having to negotiate attributes for each service request separately.

In block 416, the method 400 includes informing each enterprise of an extent to which the S-SLA requirements are capable of being met in roaming situations.

In block 418, the method 400 includes transmitting an S-SLA compliance monitoring request to the SSOF in each VPLMN. In some examples, S-SLA compliance monitoring results are normally sent by the VPLMNs at regular intervals without explicitly requesting the compliance monitoring results. An example of a method for monitoring for S-SLA fulfillment or compliance according to some embodiments of inventive concepts is described with reference to FIGS. 12 and 13.

In block 420, the method 400 includes receiving compliance monitoring requests from one or more enterprises and/or the SSOF in one or more VPLMNs.

In block 422, the method 400 includes transmitting an S-SLA compliance monitoring result to each enterprise and each SSOF from which the compliance monitoring request was received.

In block 424, the method 400 includes maintaining a capability mapping data repository 1402 (FIG. 14) for common guaranteed security baselines in the HPLMN, the VPLMN, and service specific security baseline capabilities per PLMN and per enterprise.

Figure 5:
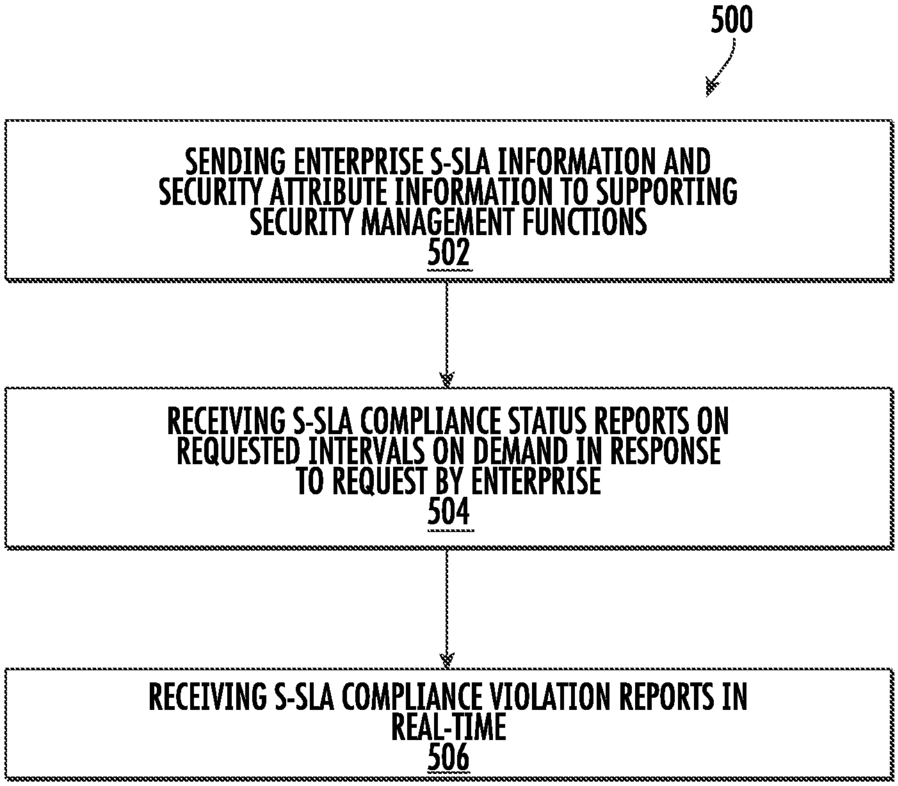
FIG. 5 is a flow chart of an example of a method of operation of a SSOF in a HPLMN interacting with supporting security management functions according to some embodiments of inventive concepts.

FIG. 5 is a flow chart of an example of a method 500 of operation of a SSOF 202 in a HPLMN 102 interacting with supporting security management functions 206 according to some embodiments of inventive concepts. The SSOF 202 in the HPLMN 102 interacts with supporting security management functions 206 to perform a set of functions as indicated by the method 500. In block 502, the method 500 includes sending S-SLA information and security attribute information associated with a particular enterprise to the supporting security management functions, e.g., the support security management functions 206 in FIG. 2. In block 504, the method 500 includes receiving S-SLA compliance status reports on requested intervals and on demand in response to a request from the particular enterprise. In block 506, the method 500 includes receiving S-SLA compliance violation reports in real-time. The SSOF can interact with other network functions and network services directly or indirectly.

Figure 6:
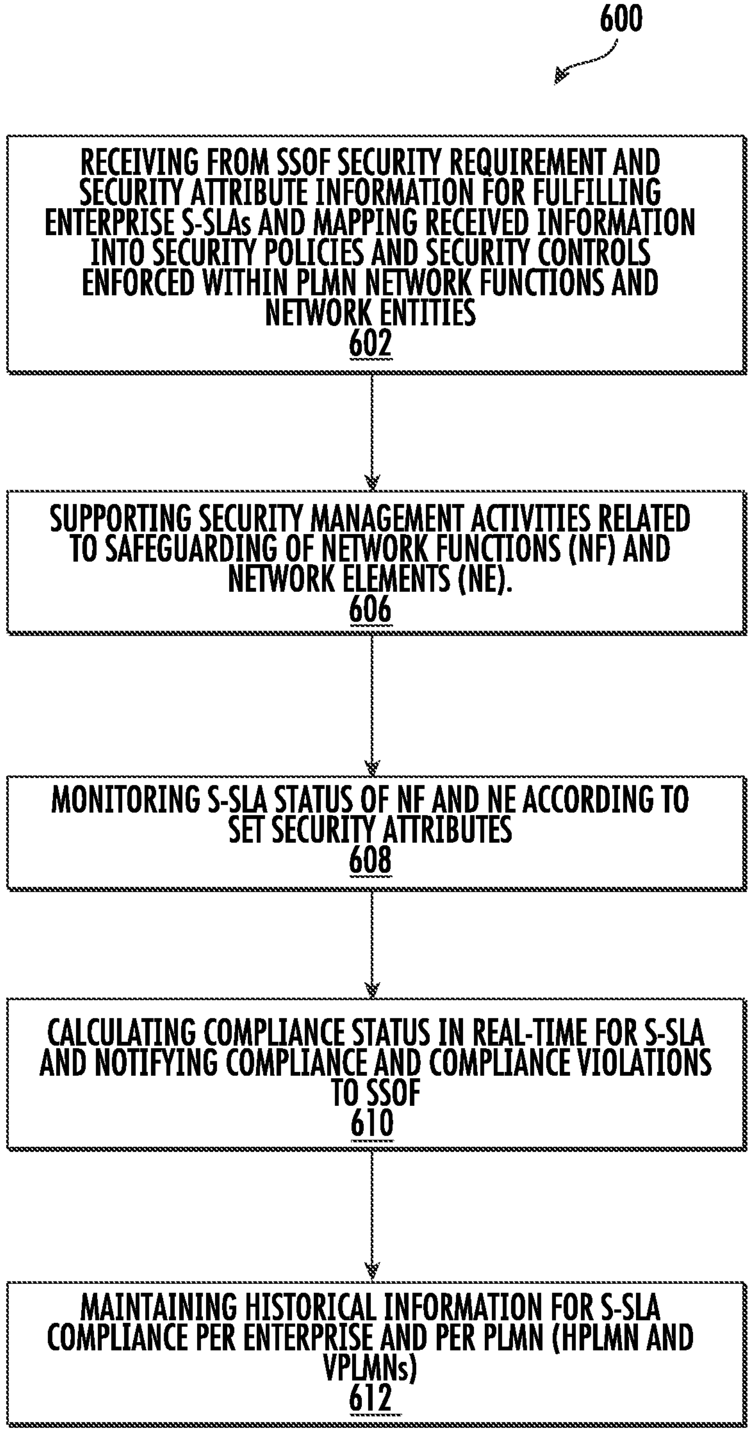
FIG. 6 is a flow chart of an example of a method of operation of supporting security management functions according to some embodiments of inventive concepts.

FIG. 6 is a flow chart of an example of a method 600 of operation of supporting security management functions according to some embodiments of inventive concepts. In some examples, the supporting security management functions include at least one of the functions of blocks 602-612 in FIG. 6. As illustrated in FIG. 2, there are supporting security management functions 206 that provide information to the SSOF 202 of the HPLMN 102, and which receive information and action requests from the SSOF 202. The supporting security management functions provide typically the type of supporting functions described in the method 600; however, the security management functions are not limited to those in the method 600.

In block 602, the method 600 includes receiving from the SSOF in the HPLMN, security requirement and security attribute information for fulfilling the S-SLA of each enterprise and mapping the security requirement and security attribute information into security policies and security controls for enforcement within the HPLMN network functions and network entities.

In block 606, the method 600 includes supporting security management activities related to safeguarding of the HPLMN network functions (NF) and the network elements (NE) as agreed in S-SLA's with each VPLMN.

In block 608, the method 600 includes monitoring S-SLA status of NF and NE according to set security attributes.

In block 610, the method 600 includes calculating compliance status in real-time for the S-SLA of each enterprise and notifying compliance scores and compliance violations to the SSOF in the HPLMN.

In block 612, the method 600 includes maintaining historical information for S-SLA compliance per enterprise and per PLMN.

Figure 7:
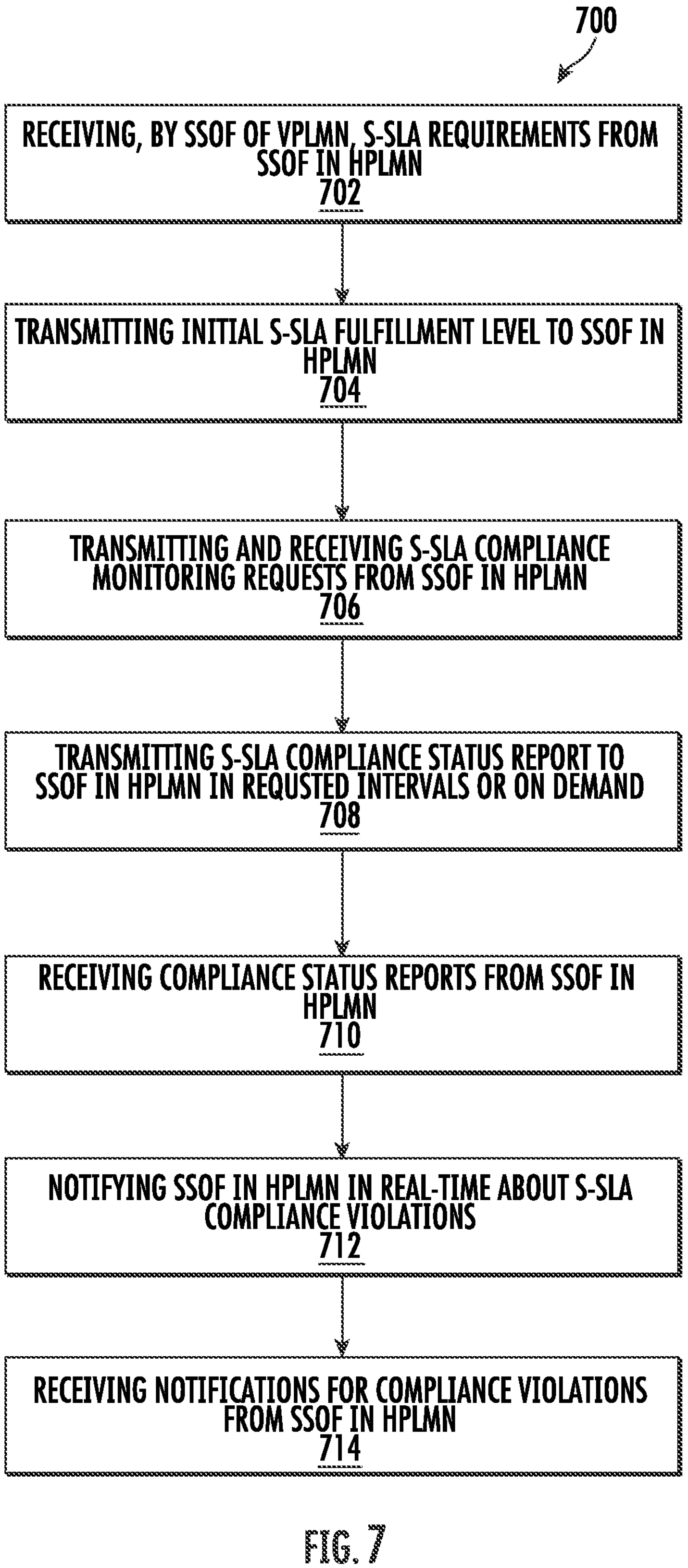
FIG. 7 is a flow chart of an example of a method of operation of a SSOF in a VPLMN according to some embodiments of inventive concepts.

FIG. 7 is a flow chart of an example of a method 700 of operation of a SSOF in a VPLMN according to some embodiments of inventive concepts. The method 700 is implemented by a security service orchestration function (SSOF) in a communication infrastructure, that includes a plurality of public land mobile networks (PLMNs) and a plurality of enterprises, for orchestration of a security service level agreement (S-SLA). In accordance with some examples, the communication infrastructure corresponds to the communications system 100 in FIG. 1. The plurality of PLMNs include a HPLMN 102 and a plurality of other PLMNs or VPLMNs 104*a*-104*b*. The plurality of enterprises include enterprises 106*a*-106*n*.

In block 702, the method 700 includes receiving, by a SSOF in a visited public land mobile network (VPLMN), S-SLA requirements from a SSOF in a home public land mobile network (HPLMN).

In block 704, the method 700 includes transmitting, by the SSOF of the VPLMN, an initial S-SLA fulfillment level to the SSOF in the HPLMN in response to receiving the S-SLA requirements.

In block 706, the method 700 includes receiving, by the SSOF of the VPLMN, a S-SLA compliance monitoring request from the SSOF in the HPLMN. The method 700 in block 706 also includes transmitting, by the SSOF of the VPLMN, another S-SLA monitoring request to the SSOF in the HPLMN.

In block 708, the method 700 includes transmitting, by the SSOF of the VPLMN, a S-SLA compliance status report to the SSOF in the HPLMN in response to receiving the S-SLA compliance monitoring request and/or in requested intervals.

In block 710, the method 700 includes receiving, by the SSOF of the VPLMN, a S-SLA compliance status report from the SSOF in the HPLMN in response to transmitting the S-SLA compliance monitoring request by the SSOF of the VPLMN.

In block 712, the method 700 includes notifying the SSOF in the HPLMN in real-time about any S-SLA compliance violations.

In block 714, the method 700 includes receiving a notification for any S-SLA compliance violations from the SSOF in the HPLMN.

Figure 8:
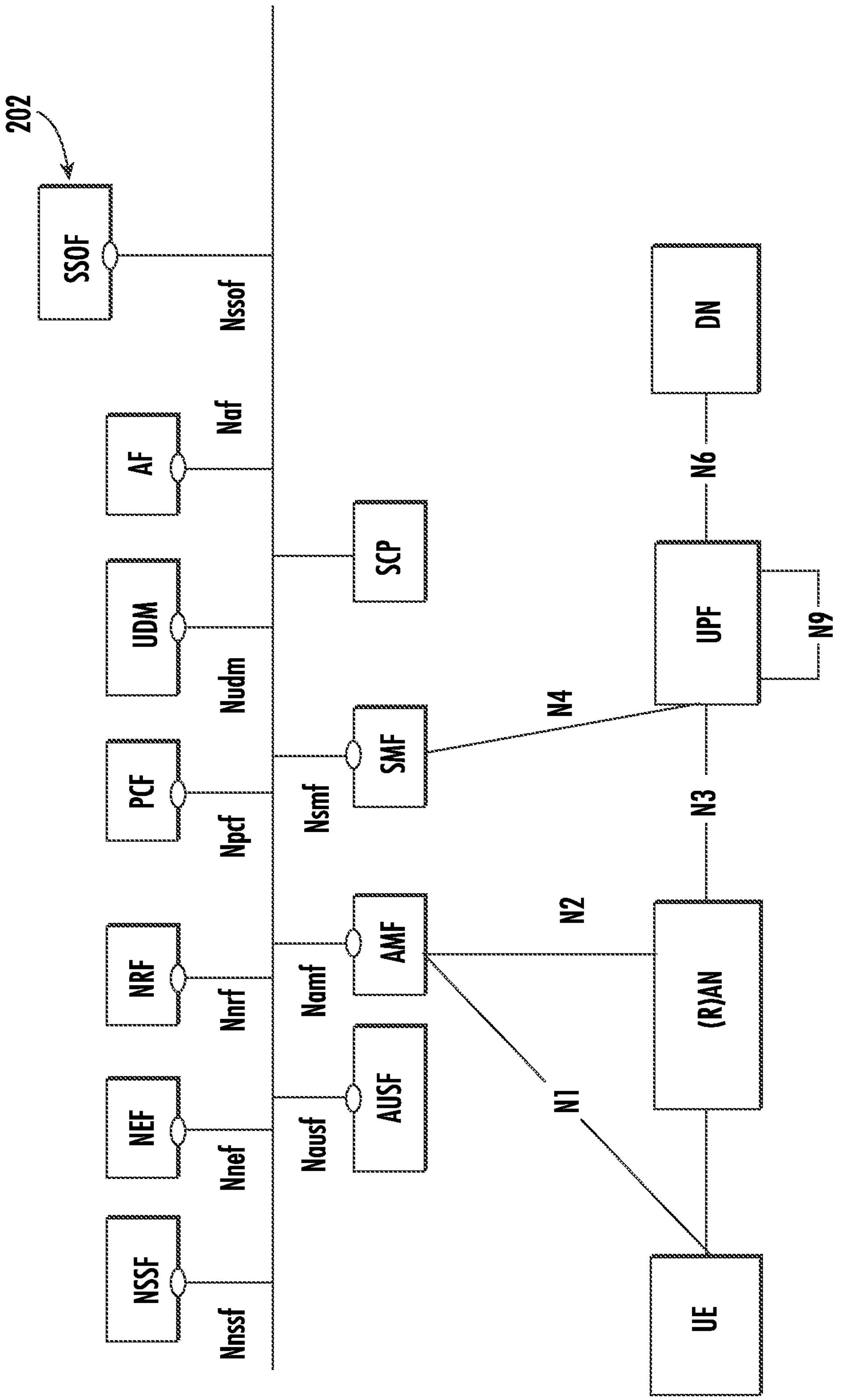
FIG. 8 is an example of a SSOF in a 3GPP 5G non-roaming architecture according to some embodiments of inventive concepts.
Figure 9:
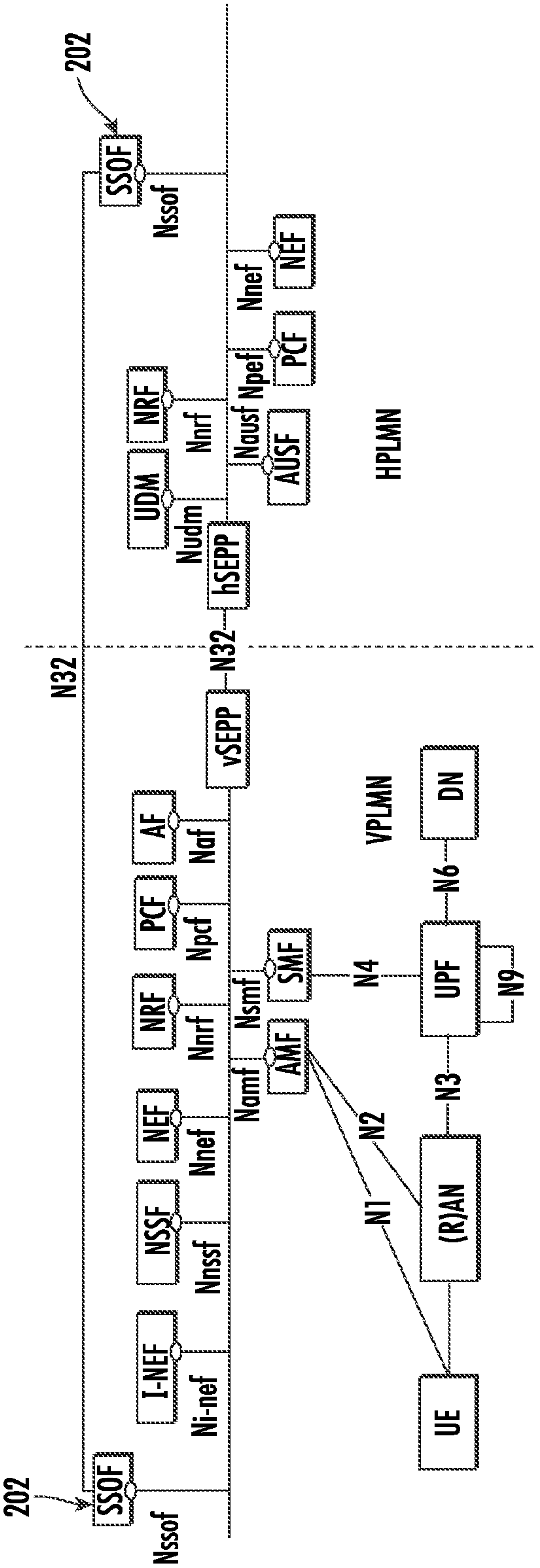
FIG. 9 is an example of a SSOF in a 3GPP 5G roaming architecture according to some embodiments of inventive concepts.

FIG. 8 is an example of a SSOF in a 3GPP 5G non-roaming architecture according to some embodiments of inventive concepts. FIG. 9 is an example of a SSOF in a 3GPP 5G roaming architecture according to some embodiments of inventive concepts. In the roaming architecture in FIG. 9, N32 interface is configured for communication between a HPLMN and a VPLMN. As shown in FIG. 9, the SSOF 202 in the HPLMN interacts directly with the SSOF 202 in VPLMN. According to 5G system architecture principles, the SSOF 202 can interact with other NF and its network function services directly or indirectly via a service communication proxy if required. As previously described, the SSOF introduces a new service-based interface Nssof used towards VPLMNs and enterprises for the purposes of negotiating the security service level agreements and exchanging information on the S-SLA security attributes.

Figure 10A:
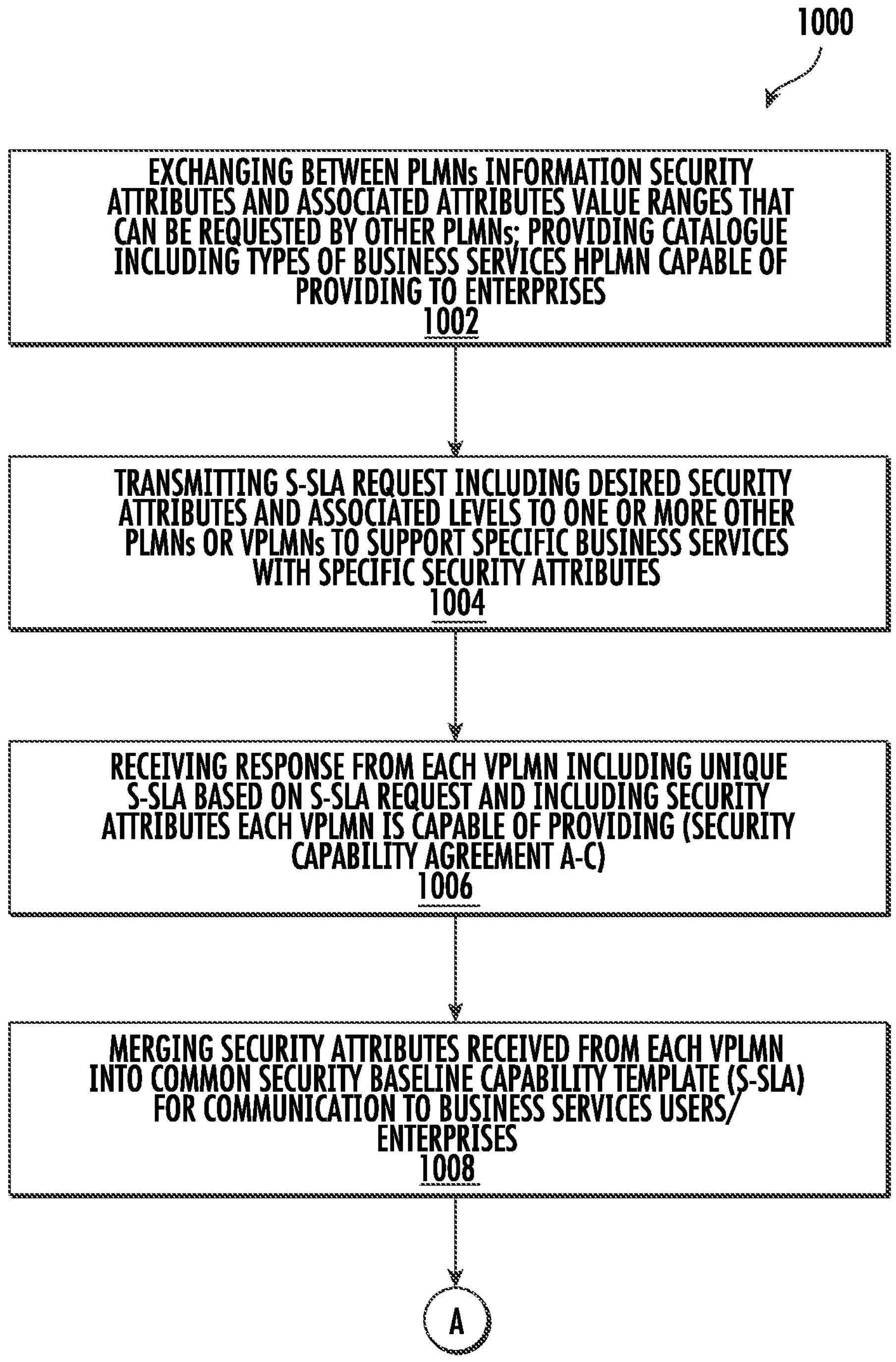
FIGS. 10A-10C are a flow chart of an example of a method of operation of a SSOF according to some embodiments of inventive concepts.
Figure 10B:
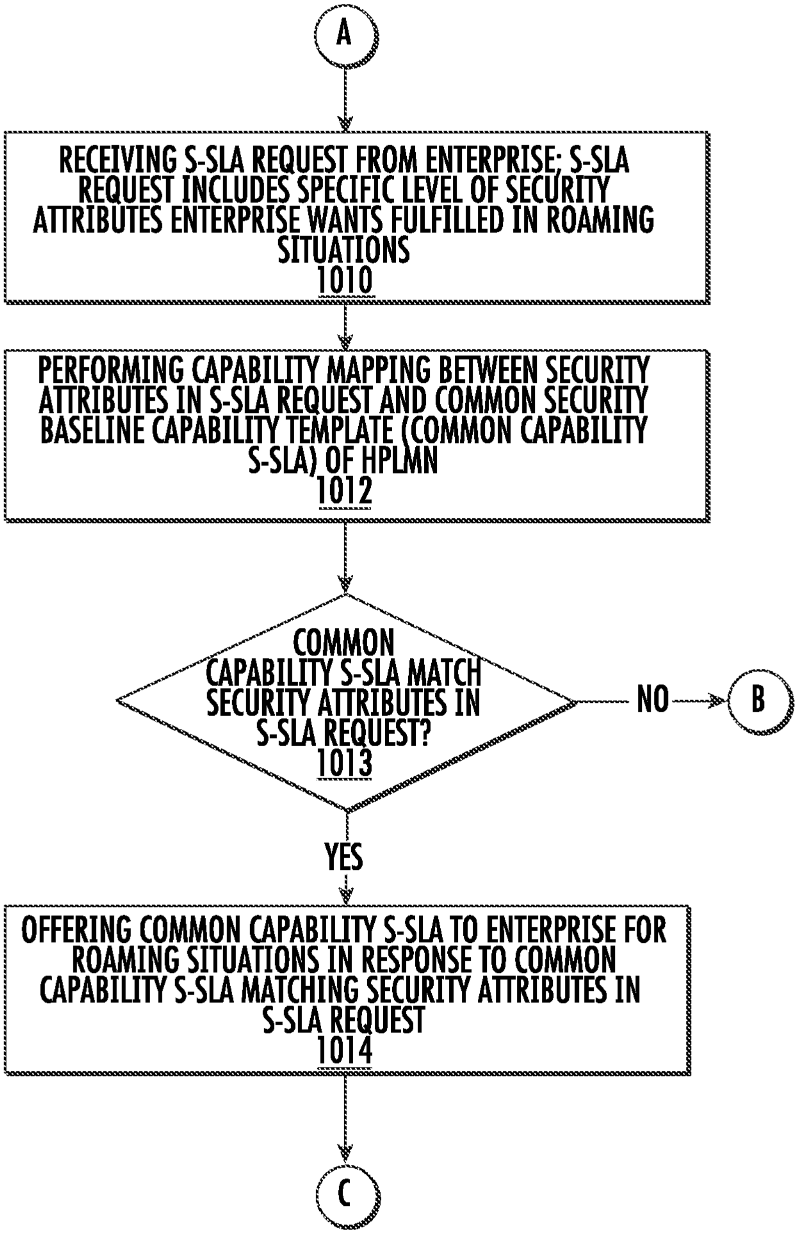
Figure 10C:
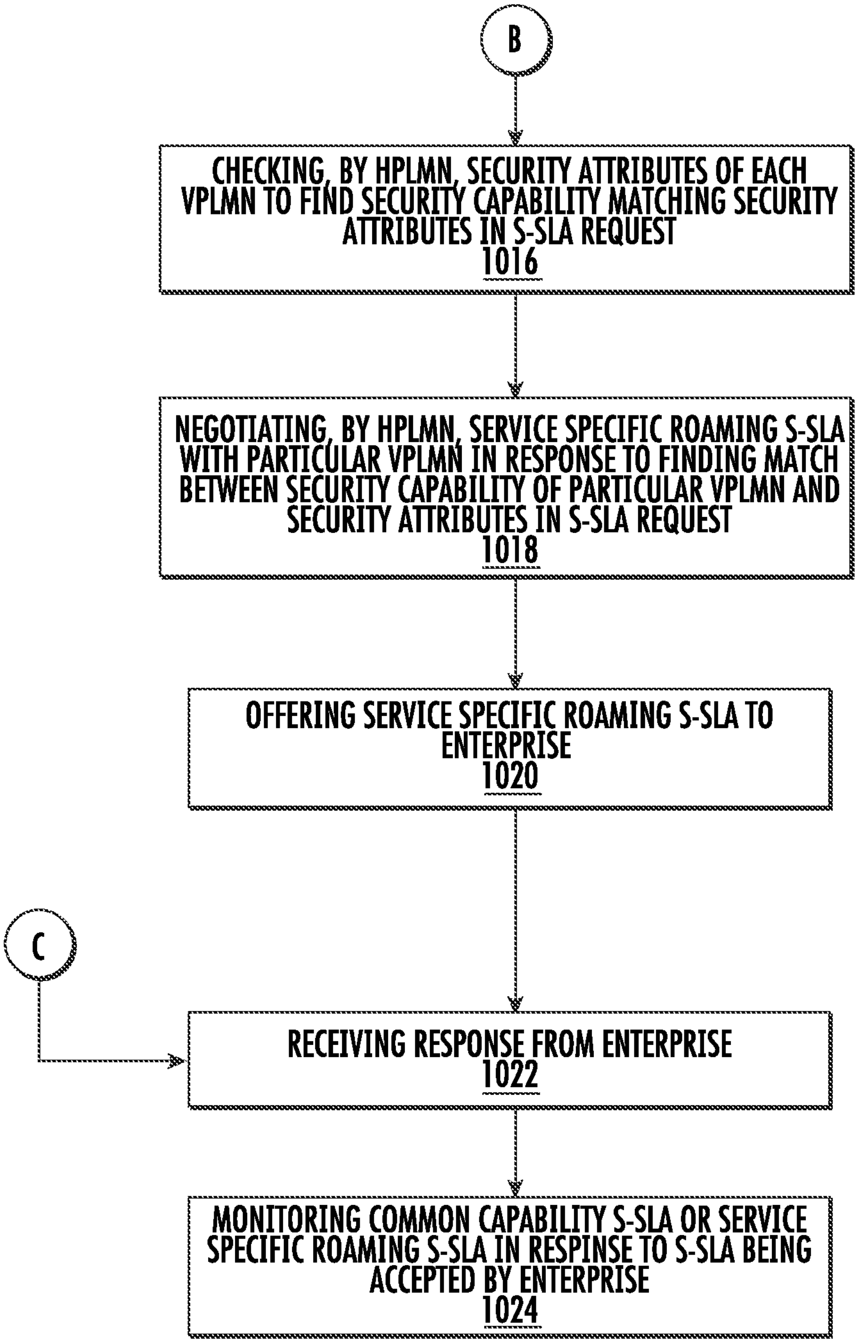
Figure 11:
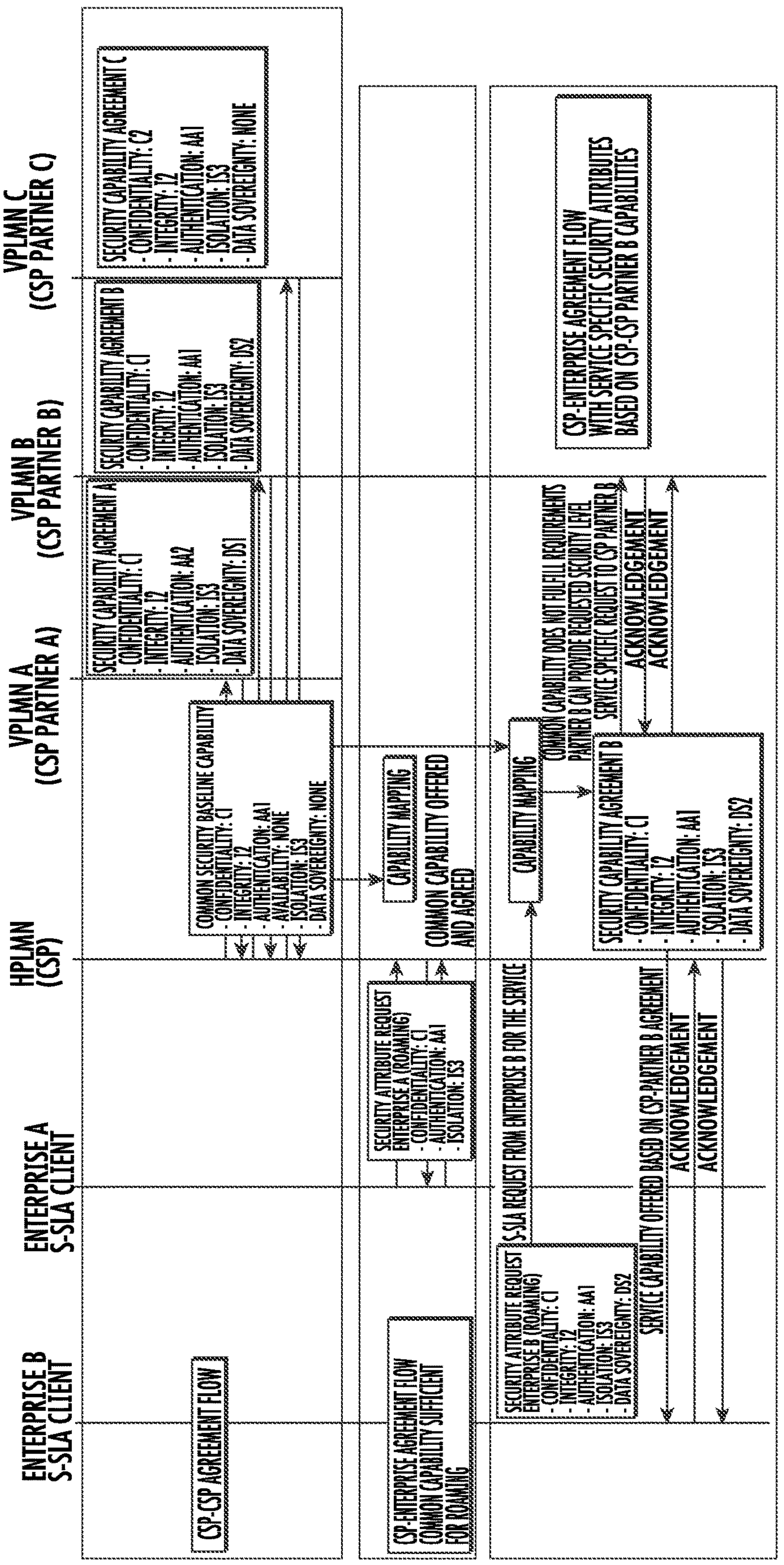
FIG. 11 is an illustration of an example of an agreement flow between a HPLMN and VPLMNs and between the HPLMN and enterprises for negotiation of S-SLA's corresponding to the exemplary method in FIGS. 10A-10C according to some embodiments of inventive concepts.

FIGS. 10A-10C are a flow chart of an example of a method 1000 of operation of a SSOF according to some embodiments of inventive concepts. The method 1000 is implemented by a security service orchestration function (SSOF) in a communication infrastructure, that includes a plurality of public land mobile networks (PLMNs) and a plurality of enterprises, for orchestration of a security service level agreement (S-SLA). In accordance with some examples, the SSOF is performed by the SSOF 202 in FIG. 2 of the HPLMN 102. The plurality of PLMNs include the HPLMN 102 and VPLMNs 104*a*-104*n* in the example in FIG. 1 and the plurality of enterprises include the enterprises 106*a*-106*n*. Referring also to FIG. 11, FIG. 11 is an illustration of an example of an agreement flow for negotiation of S-SLA's corresponding to the exemplary method in FIGS. 10A-10C according to some embodiments of inventive concepts. FIG. 11 illustrates messages transmitted between the HPLMN and VPLMNs and between the HPLMN and enterprises for negotiation of S-SLA's between the entities.

In block 1002, the method 1000 includes exchanging between the PLMNs (HPLMN 102 and VPLMNs 104*a*-104*n*) information security attributes and associated attribute value ranges that each PLMN can request from the other PLMNs. The method 1000 also includes providing, by the HPLMN, a catalogue to each enterprise of the plurality of enterprises serviced by the HPLMN. The catalogue includes types of business services the HPLMN is capable of providing and that the enterprises can request from the HPLMN.

In block 1004, the method 1000 includes transmitting, by the home public land mobile network (HPLMN) of the plurality of PLMNs, a S-SLA request to one or more visited public land mobile networks (VPLMNs) of the plurality of PLMNs to support specific business services with specific security attributes.

In block 1006, the method 1000 includes receiving a response from each VPLMN including a unique S-SLA (security capability agreements A-C in FIG. 11) including security attributes the VPLMN is capable of providing and based on the S-SLA request.

In block 1008, the method 1000 includes merging the security attributes received from each VPLMN into a common security baseline capability template S-SLA (e.g., common security baseline capability template S-SLA 112 in FIG. 1) for communication to business services users or each of the enterprises.

In block 1010 (FIG. 10B), the method 1000 includes receiving, by the HPLMN, an enterprise S-SLA request from a requesting enterprise of the plurality of enterprises. The enterprise S-SLA request includes a specific level of security attributes the requesting enterprise wants fulfilled in roaming situations.

In block 1012, the method 1000 includes performing capability mapping between the security attributes in the enterprise S-SLA request and the common security baseline capability template S-SLA of the HPLMN. The common security baseline capability template S-SLA defines a common capability S-SLA (e.g., common enterprise S-SLA 114) offerable by the HPLMN to the enterprises.

In block 1013, the method 1000 includes determining whether the common capability S-SLA matches the security attributes in the S-SLA request in response to the capability mapping. If the common capability S-SLA matches the security attributed in the S-SLA request, the method 1000 advances to block 1014. If the common capability S-SLA does not match the security attributes in the S-SLA request, the method 1000 advances to block 1016.

In block 1014, the method 1000 includes offering the common capability S-SLA to the requesting enterprise for roaming situations in response to the common security baseline capability template S-SLA matching the security attributes in the enterprise S-SLA request. The method 1000 advances to block 1022 (FIG. 10C) in response to offering the common capability S-SLA to the requesting enterprise for roaming. In block 1022, the method 1000 includes receiving a response from the requesting enterprise. The response includes an acceptance or a decline of the common capability S-SLA.

In block 1016 (FIG. 10C), the method 1000 includes checking, by the HPLMN or SSOF of the HPLMN, security attributes of each VPLMN to find a security capability matching the security attributes in the enterprise S-SLA request in response to the common security baseline capability template S-SLA not matching the security attributes in the enterprise S-SLA request.

In block 1018, the method 1000 includes negotiating a service specific roaming S-SLA with a particular VPLMN in response to finding a match between the security capability of the particular VPLMN and the security attributes in the enterprise S-SLA request.

In block 1020, the method 1000 includes offering the service specific roaming S-SLA to the requesting enterprise in response to negotiating the service specific roaming S-SLA with the particular VPLMN.

In block 1022, the method 1000 includes receiving a response from the requesting enterprise. The response including an acceptance or a decline of the service specific S-SLA.

The method 1000 is repeated per enterprise, per service and per trust domain.

In block 1024, the method 1000 includes monitoring the common capability S-SLA or the service specific roaming S-SLA for compliance in response to being accepted by the requesting enterprise. An example of a method for monitoring the common capability S-SLA or the service specific roaming S-SLA for compliance will be described with reference to FIGS. 12 and 13.

FIG. 11 is an illustration of an example of an agreement flow between a HPLMN and VPLMNs and between the HPLMN and enterprises for negotiation of S-SLA's corresponding to the exemplary method in FIGS. 10A-10C according to some embodiments of inventive concepts. The example in FIG. 11 illustrated the end-to-end S-SLA negotiation between different PLMNs (CSPs) and enterprises for roaming situations in FIG. 1.

As previously described with respect to block 1002 in FIG. 10A, at an initialization state the PLMNs exchange information security attributes with attribute value ranges that can be requested by other PLMNs. At the initialization state the HPLMN provides to its enterprises or enterprise customers a catalogue for different types of business services the enterprises can request from the HPLMN and a catalogue of security attributes with attribute value ranges that can be requested from the HPLMN. The communications for end-to-end agreement flow is illustrated in FIG. 11. The illustrated flow from the PLMN perspective is applied into a 3GPP roaming situation.

The HPLMN sends S-SLA requests to other VPLMNs including all security attributes. Based on the negotiation scheme, the HPLMN formulates a common security baseline capability template S-SLA which is used as a default offering in roaming situations.

At reception of a S-SLA request from an enterprise, the HPLMN performs capability mapping between HPLMN the common security baseline capacity and enterprise S-SLA requested attributes. If the common capability can fulfil the enterprise needs, the common enterprise S-SLA is offered to the enterprise to be used for roaming situations. If the common security baseline capability cannot fulfill the enterprise requirements, HPLMN checks the attributes of partner VPLMNs. When the HPLMN finds a matching partner capability, the HPLMN negotiates a service specific roaming S-SLA and offers that service specific capability to the enterprise.

The HPLMN can repeat and apply the same procedure per enterprise, per service and per trust domain. The enterprise can always decline the HPLMN offer. Accepted offers enter a monitoring mode by the HPLMN automatically.

Examples of information elements (objects) contained in a S-SLA initial request are presented in the table below.

| Information element | Description | Category |
|---|---|---|
| Target enterprise identifier | Indicates enterprise that requests the S-SLA fulfillment | Mandatory for CSP-enterprise flow |
| Target enterprise user | Indicates enterprise users that S-SLA fulfillment shall apply to | Optional |
| Target CSP identifier | Indicates specific CSPs that fulfill the S-SLA in roaming situations | Mandatory for CSP-CSP flow |
| Confidentiality attributes | Defines the confidentiality related security attributes to be fulfilled | Optional |
| Target integrity attributes | Defines the integrity related security attributes to be fulfilled | Optional |
| Target authentication attributes | Defines the authentication related security attributes to be fulfilled | Optional |
| Target non-repudiation attributes | Defines the non-repudiation related security attributes to be fulfilled | Optional |
| Target availability attributes | Defines the availability related security attributes to be fulfilled | Optional |
| Target isolation attributes | Defines the isolation related security attributes to be fulfilled | Optional |
| Target data sovereignty attributes | Defines the data sovereignty related security attributes to be fulfilled | Optional |
| Validity condition | Indicates that S-SLA applies only to the specific locations or area of interest | Optional |
| Temporal validity conditions | Time interval for periodic S-SLA re-registration or handshake | Optional |
| Subscription of S-SLA compliance monitoring events | Defines the regular interval for compliance notifications | Optional |
| Allowed IP-domains | Indicates which IP-domains are allowed for data to be passed through without extra protection | Optional |

-continued

| Information element | Description | Category |
|---|---|---|
| Extra data protection controls | Indicates which extra data protection options are required if there are no available routing options only within allowed IP-domains | Optional |

Figure 12:
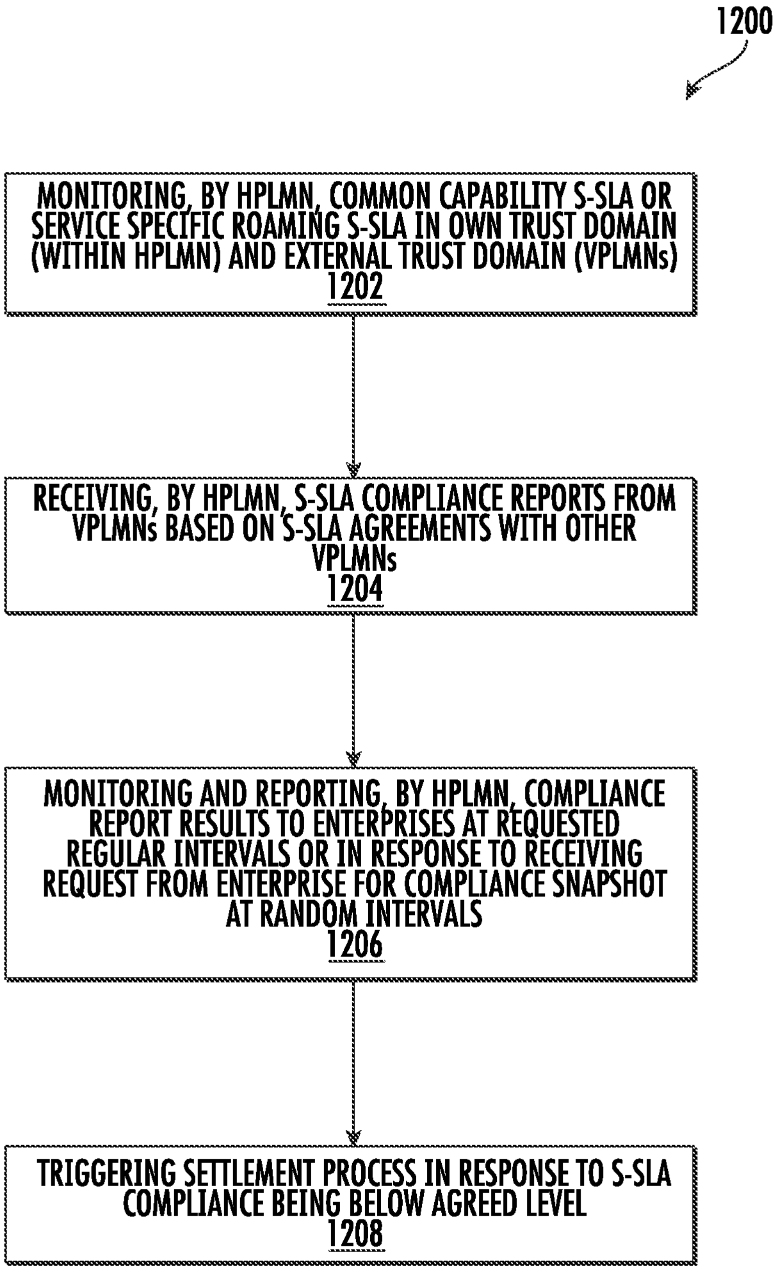
FIG. 12 is a flow chart of an example of a method for monitoring for S-SLA fulfillment or compliance according to some embodiments of inventive concepts.
Figure 13:
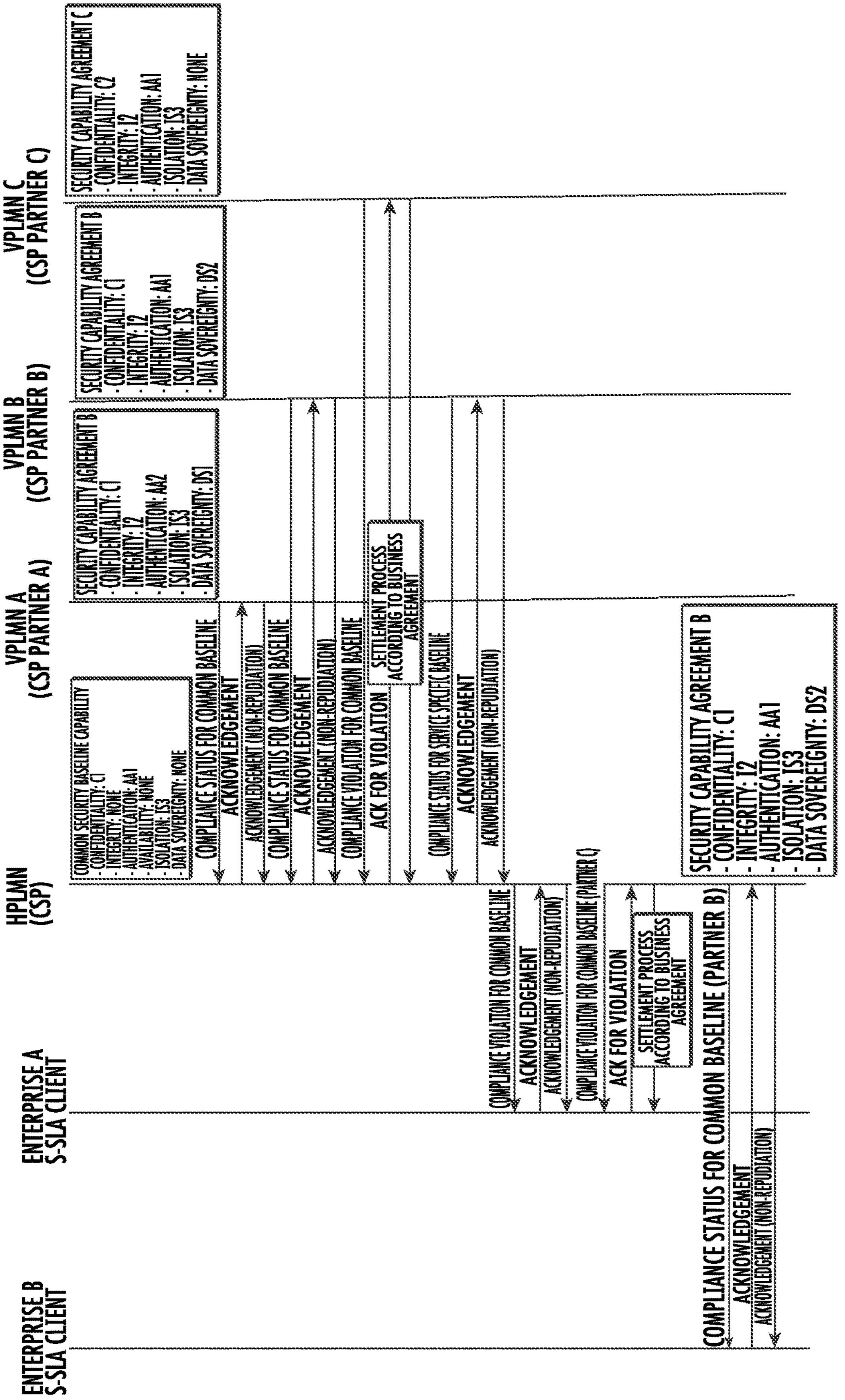
FIG. 13 is an illustration of an example of a monitoring flow for S-SLA fulfillment or compliance corresponding to the exemplary method in FIG. 12 according to some embodiments of inventive concepts.

FIG. 12 is a flow chart of an example of a method 1200 for monitoring for S-SLA fulfillment or compliance according to some embodiments of inventive concepts. Referring also to FIG. 13, FIG. 13 is an illustration of an example of a monitoring flow for S-SLA fulfillment or compliance corresponding to the exemplary method in FIG. 12 according to some embodiments of inventive concepts. FIG. 13 illustrates an example of message flows between the HPLMN and the VPLMNs and between the HPLMN and the enterprises for end-to-end monitoring of S-SLA compliance. In some examples, the method 1200 is used to perform the monitoring in block 1024 in FIG. 10C.

In block 1202, the method 1200 includes monitoring, by a HPLMN, the common capability S-SLA or service specific roaming S-SLA in the HPLMN's own trust domain and external trust domains of the VPLMNs. In monitoring either the common capability S-SLA or the service specific roaming S-SLA, the HPLMN monitors the agreed security attributes for different services within the HPLMN's own trust domain and HPLMN's external trust domain.

In block 1204, the method 1200 includes receiving by the HPLMN, S-SLA compliance reports from VPLMNs based on the S-SLA agreements with the VPLMNs.

In block 1206, the method 1200 includes monitoring and reporting, by the HPLMN, compliance report results to the enterprises at requested regular intervals or in response to receiving a request from an enterprise for a compliance snapshot at random intervals, e.g., for auditing purposes.

In block 1208, the method 1200 includes triggering a settlement process in response to S-SLA compliance being below an agreed level according to the S-SLA or business agreement between the HPLMN and a particular enterprise.

Figure 14:
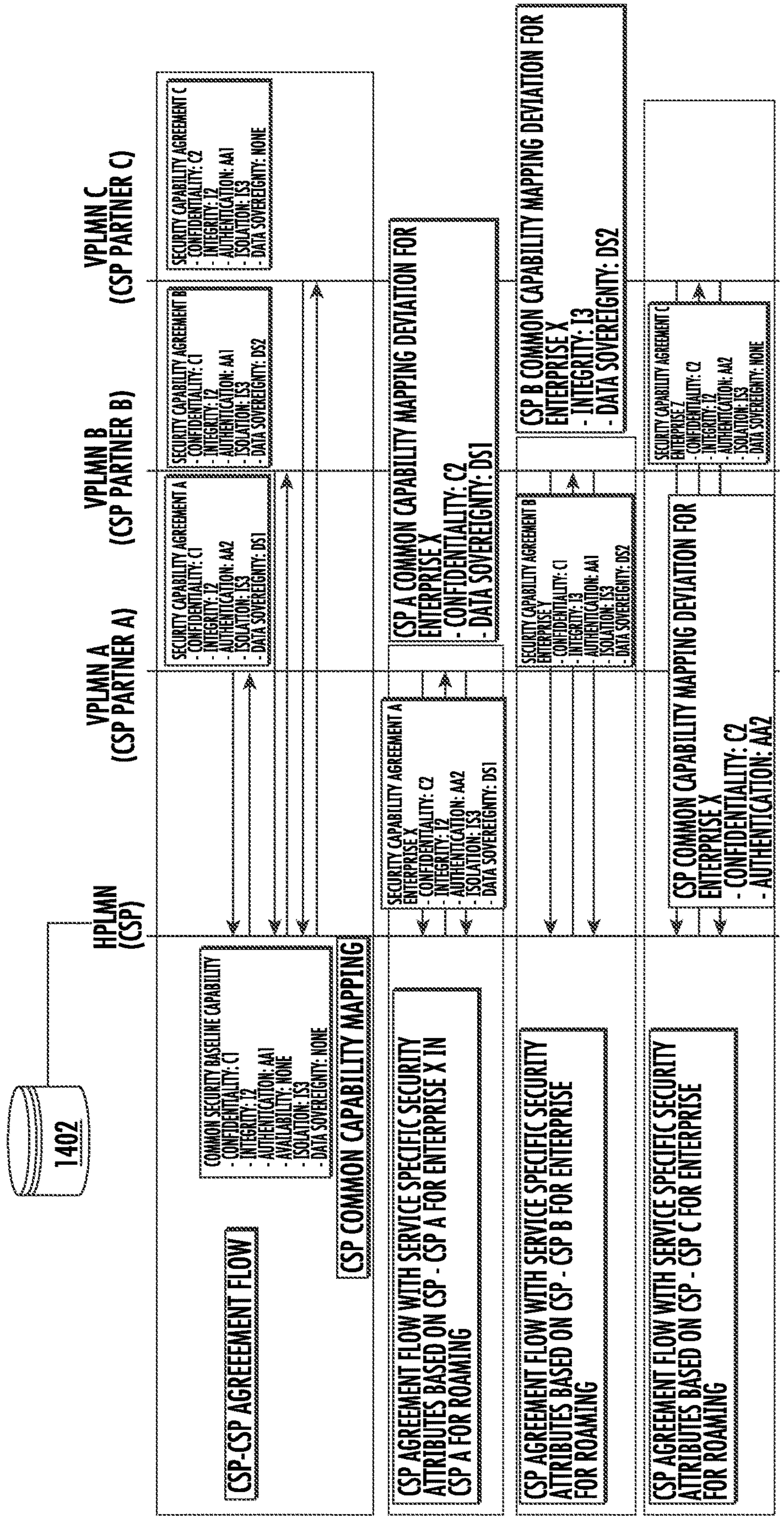
FIG. 14 is an illustration of an example of capability mapping from a HPLMN perspective according to some embodiments of inventive concepts.
Figure 15:
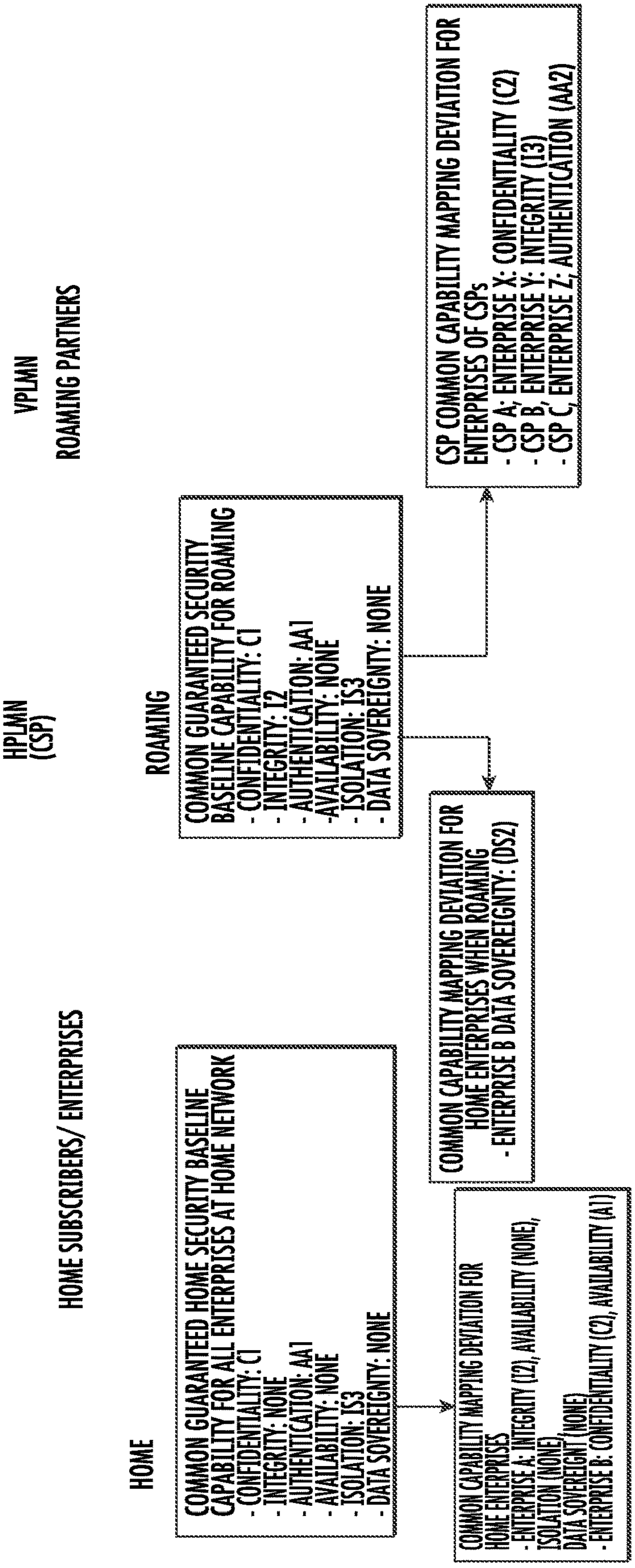
FIG. 15 is an illustration of an example of capability mapping management for a HPLMN according to some embodiments of inventive concepts.

FIG. 14 is an illustration of an example of capability mapping from a HPLMN perspective according to some embodiments of inventive concepts. In some examples, the capability mapping illustrated in FIG. 14 is used for the capability mapping in block 412 of FIG. 4A and block 1012 in FIG. 10B. The example in FIG. 14 illustrates an end-to-end S-SLA capability mapping flow from a perspective of the HPLMN, where the HPLMN has a variety of S-SLA agreements in place for roaming situations. The HPLMN needs to check automatically and dynamically from a capability mapping data repository 1402 whether to apply common security baseline capability mapping for a roaming enterprise user or whether to apply enterprise service specific security capabilities for a roaming enterprise user. As a result of capability mapping, the SSOF 202 and supporting security management functions 206 (FIG. 2) manage automatically and dynamically capabilities for both HPLMN and for VPLMN roaming situations as shown in the example in FIG. 15. FIG. 15 is an illustration of an example of capability mapping management for a HPLMN according to some embodiments of inventive concepts. The HPLMN has common guaranteed capability mapping applicable for HPLMN users and enterprise service specific capability mappings. These can be dynamically updated and adjusted based on the requests the HPLMN receives from the enterprises. The HPLMN maintains in a similar way common guaranteed capability mapping applicable for all roaming users and separate capability mappings per enterprise and per service for roaming situations.

Example embodiments are discussed below.

1. A method implemented by a security service orchestration function (SSOF) in a communication infrastructure, that includes a plurality of public land mobile networks (PLMNs) and a plurality of enterprises, for orchestration of a security service level agreement (S-SLA), the method comprising:

receiving, by a SSOF in a home public land mobile network (HPLMN), a S-SLA request from one or more of the plurality of enterprises, wherein each S-SLA request comprises a plurality of requirements and wherein the HPLMN corresponds to one of the plurality of PLMNs and wherein each of the enterprises serves a plurality of end users;

converting each S-SLA request into a consistent and unified S-SLA offerable to each enterprise, wherein the consistent and unified S-SLA comprises security attributes that the HPLMN is capable of providing each of the enterprises;

offering the consistent and unified S-SLA to each enterprise that submitted the S-SLA request; and transforming each S-SLA request from the one or more enterprises into security policies and controls to be enforced within the HPLMN.

2. The method of embodiment 1, further comprising:

negotiating, by the SSOF in the HPLMN, fulfillment of the consistent and unified S-SLA with a SSOF in a visited public land mobile network (VPLMN) in roaming situations; and negotiating, by the SSOF in the HPLMN with a SSOF in another VPLMN, service specific S-SLA fulfillment in response to a requested S-SLA fulfillment being unachievable with the consistent and unified S-SLA.

3. The method of any of embodiments 1-2, further comprising capability mapping of supported security attributes for business services available in different VPLMNs to requested business services specific security attributes that the HPLMN is capable of providing the enterprises in their S-SLA requests.

4. The method of any of embodiments 1-3, further comprising providing capability mapping and optimization between HPLMN and VPLMN security attributes.

5. The method of any of embodiments 1-4, further comprising informing each enterprise of an extent to which S-SLA requirements are capable of being meet in roaming situations.

6. The method of any of embodiments 1-5, further comprising transmitting an S-SLA compliance monitoring request to the SSOF in each VPLMN.

7. The method of any of embodiments 1-6, further comprising:

receiving compliance monitoring requests from one or more enterprises and the SSOF in one or more VPLMNs; and transmitting an S-SLA compliance monitoring result to each enterprise and each SSOF from which the compliance monitoring request was received.

8. The method of any of embodiments 1-7, further comprising maintaining a capability data repository for common guaranteed security baselines in the HPLMN, the VPLMN, and service specific security baseline capabilities per PLMN, per enterprise.

9. The method of any of embodiments 1-8, wherein the SSOF in the HPLMN interacts with supporting security management functions to perform a set of functions comprising:

sending S-SLA information and security attribute information associated with a particular enterprise to the supporting security management functions;

receiving S-SLA compliance status reports on requested intervals and on demand in response to a request from the particular enterprise; and receiving S-SLA compliance violation reports in real-time.

10. The method of embodiment 9, wherein the supporting security management functions comprise at least one of:

receiving, from the SSOF in the HPLMN, security requirement and security attribute information for fulfilling the S-SLA of each enterprise and mapping the security requirement and security attribute information into security policies and security controls for enforcement within the HPLMN network functions and network entities;

supporting security management activities related to safeguarding of the HPLMN network functions (NF) and the network elements (NE) as agreed in S-SLA's with each VPLMN;

monitoring S-SLA status of NF and NE according to set security attributes;

calculating compliance status in real-time for the S-SLA of each enterprise and notifying compliance scores and compliance violations to the SSOF in the HPLMN; and maintaining historical information for S-SLA compliance per enterprise and per PLMN.

11. The method of any of embodiments 1-10, wherein the SSOF comprises:

an Nssof reference point configured to interface with each VPLMN for exchanging information on S-SLA security attributes; and another Nssof reference point configured to interface with each enterprise for exchanging information on the S-SLA security attributes.

12. A computing device comprising:

processing circuitry; and memory coupled with the processing circuitry, wherein the memory includes instructions that when executed by the processing circuitry causes the computing device to, receive, by a SSOF in a home public land mobile network (HPLMN), a S-SLA request from one or more of a plurality of enterprises, wherein each S-SLA request comprises a plurality of requirements;

convert each S-SLA request into a consistent and unified S-SLA offerable to each enterprise, wherein the consistent and unified S-SLA comprises security attributes that the HPLMN is capable of providing each of the enterprises;

offer the consistent and unified S-SLA to each enterprise that submitted the S-SLA request; and transform each S-SLA request from the one or more enterprises into security policies and controls to be enforced within the HPLMN.

13. The computing device of embodiment 12, wherein the memory includes instructions that when executed by the processing circuitry causes the computing device to perform operations according to any of embodiments 2-11.

14. A computing device adapted to:

receive, by a SSOF in a home public land mobile network (HPLMN), a S-SLA request from one or more of a plurality of enterprises, wherein each S-SLA request comprises a plurality of requirements;

convert each S-SLA request into a consistent and unified S-SLA offerable to each enterprise, wherein the consistent and unified S-SLA comprises security attributes that the HPLMN is capable of providing each of the enterprises;

offer the consistent and unified S-SLA to each enterprise that submitted the S-SLA request; and transform each S-SLA request from the one or more enterprises into security policies and controls to be enforced within the HPLMN.

15. The computing device of embodiment 14 further adapted to perform according to any of embodiments 2-11.

16. A computer program comprising program code to be executed by processing circuitry of a computing device, whereby execution of the program code causes the computing device to perform operations according to any of embodiments 1-11.

17. A computer program product comprising a non-transitory storage medium including program code to be executed by processing circuitry of a computing device, whereby execution of the program code causes the computing device to perform operations according to any of embodiments 1-11.

18. A method implemented by a security service orchestration function (SSOF) in a communication infrastructure, that includes a plurality of public land mobile networks (PLMNs) and a plurality of enterprises, for orchestration of a security service level agreement (S-SLA), the method comprising:

receiving, by a SSOF in a visited public land mobile network (VPLMN), S-SLA requirements from a SSOF in a home public land mobile network (HPLMN);

transmitting, by the SSOF in the VPLMN, an initial S-SLA fulfillment level to the SSOF in the HPLMN in response to receiving the S-SLA requirements;

receiving a S-SLA compliance monitoring request from the SSOF in the HPLMN; and transmitting a S-SLA compliance status report to the SSOF in the HPLMN in response to receiving the S-SLA compliance monitoring request and/or in requested intervals.

19. The method of embodiment 18, further comprising:

transmitting another S-SLA monitoring request to the SSOF in the HPLMN; and receiving another S-SLA compliance status report from the SSOF in the HPLMN in response to the other S-SLA compliance monitoring request.

20. The method of any of embodiments 18-19, further comprising:

notifying the SSOF in the HPLMN in real-time about any S-SLA compliance violations; and receiving a notification for any S-SLA compliance violations from the SSOF in the HPLMN.

21. A computing device comprising:
processing circuitry; and
memory coupled with the processing circuitry, wherein the memory includes instructions that when executed by the processing circuitry causes the computing device to,
receive, by a SSOF in a visited public land mobile network (VPLMN), S-SLA requirements from a SSOF in a home public land mobile network (HPLMN);
transmit, by the SSOF in the VPLMN, an initial S-SLA fulfillment level to the SSOF in the HPLMN in response to receiving the S-SLA requirements;
receive a S-SLA compliance monitoring request from the SSOF in the HPLMN; and transmit a S-SLA compliance status report to the SSOF in the HPLMN in response to receiving the S-SLA compliance monitoring request and/or in requested intervals.

22. The computing device of embodiment 21, wherein the memory includes instructions that when executed by the processing circuitry causes the computing device to perform operations according to any of embodiments 19-20.

23. A computing device adapted to:
receive, by a SSOF in a visited public land mobile network (VPLMN), S-SLA requirements from a SSOF in a home public land mobile network (HPLMN);
transmit, by the SSOF in the VPLMN, an initial S-SLA fulfillment level to the SSOF in the HPLMN in response to receiving the S-SLA requirements;
receive a S-SLA compliance monitoring request from the SSOF in the HPLMN; and
transmit a S-SLA compliance status report to the SSOF in the HPLMN in response to receiving the S-SLA compliance monitoring request and/or in requested intervals.

24. The computing device of embodiment 23 further adapted to perform according to any of embodiments 19-20.

25. A computer program comprising program code to be executed by processing circuitry of a computing device, whereby execution of the program code causes the computing device to perform operations according to any of embodiments 18-20.

26. A computer program product comprising a non-transitory storage medium including program code to be executed by processing circuitry of a computing device, whereby execution of the program code causes the computing device to perform operations according to any of embodiments 18-20.

27. A method implemented by a security service orchestration function (SSOF) in a communication infrastructure, that includes a plurality of public land mobile networks (PLMNs) and a plurality of enterprises, for orchestration of a security service level agreement (S-SLA), the method comprising:
transmitting, by a home public land mobile network (HPLMN) of the plurality of PLMNs, a S-SLA request to one or more visited public land mobile networks (VPLMNs) of the plurality of PLMNs to support specific business services with specific security attributes;
receiving a response from each VPLMN including a unique S-SLA including security attributes the VPLMN is capable of providing and based on the S-SLA request; and
merging the security attributes received from each VPLMN into a common security baseline capability template S-SLA for communication to business services users or each of the enterprises.

28. The method of embodiment 27, further comprising exchanging between the PLMNs information security attributes and associated attribute value ranges that each PLMN can request from the other PLMNs.

29. The method of any of embodiments 27-28, further comprising providing, by the HPLMN, a catalogue to each enterprise of the plurality of enterprises serviced by the HPLMN, the catalogue comprising types of business services the HPLMN is capable of providing and that the enterprises can request from the HPLMN.

30. The method of any of embodiments 27-29, further comprising:
receiving, by the HPLMN, an enterprise S-SLA request from a requesting enterprise of the plurality of enterprises, wherein the enterprise S-SLA request comprises a specific level of security attributes the requesting enterprise wants fulfilled in roaming situations;
performing capability mapping between the security attributes in the enterprise S-SLA request and the common security baseline capability template S-SLA of the HPLMN, wherein the common security baseline capability template S-SLA defines a common capability S-SLA offerable by the HPLMN to the enterprises;
offering the common capability S-SLA to the requesting enterprise for roaming situations in response to the common security baseline capability template S-SLA matching the security attributes in the enterprise S-SLA request; and
receiving a response from the requesting enterprise, wherein the response comprises an acceptance or a decline of the common capability S-SLA.

31. The method of embodiment 30, further comprising:
checking security attributes of each VPLMN to find a security capability matching the security attributes in the enterprise S-SLA request in response to the common security baseline capability template S-SLA not matching the security attributes in the enterprise S-SLA request; and
negotiating a service specific roaming S-SLA with a particular VPLMN in response to finding a match between the security capability of the particular VPLMN and the security attributes in the enterprise S-SLA request.

32. The method of embodiment 31, further comprising:
offering the service specific roaming S-SLA to the requesting enterprise in response to negotiating the service specific roaming S-SLA with the particular VPLMN; and
receiving a response from the requesting enterprise, wherein the response comprises an acceptance or a decline of the service specific S-SLA.

33. The method of any of embodiments 30-32 being repeated per enterprise, per service and per trust domain.

34. The method of any of embodiments 30-33, further comprising monitoring the common capability S-SLA or the service specific roaming S-SLA for compliance in response to being accepted by the requesting enterprise.

35. A computing device comprising:
processing circuitry; and
memory coupled with the processing circuitry, wherein the memory includes instructions that when executed by the processing circuitry causes the computing device to,
transmit, by a HPLMN of the plurality of PLMNs, a S-SLA request to one or more VPLMNs of the plurality of PLMNs to support specific business services with specific security attributes;

receive a response from each VPLMN including a unique S-SLA including security attributes the VPLMN is capable of providing and based on the S-SLA request; and merge the security attributes received from each VPLMN into a common security baseline capability template S-SLA for communication to business services users or each of the enterprises.

36. The computing device of embodiment 35, wherein the memory includes instructions that when executed by the processing circuitry causes the computing device to perform operations according to any of embodiments 28-34.

37. A computing device adapted to:

transmit, by a HPLMN of the plurality of PLMNs, a S-SLA request to one or more VPLMNs of the plurality of PLMNs to support specific business services with specific security attributes;

receive a response from each VPLMN including a unique S-SLA including security attributes the VPLMN is capable of providing and based on the S-SLA request; and merge the security attributes received from each VPLMN into a common security baseline capability template S-SLA for communication to business services users or each of the enterprises.

38. The computing device of embodiment 37 further adapted to perform according to any of embodiments 28-34.

39. A computer program comprising program code to be executed by processing circuitry of a computing device, whereby execution of the program code causes the computing device to perform operations according to any of embodiments 27-34.

40. A computer program product comprising a non-transitory storage medium including program code to be executed by processing circuitry of a computing device, whereby execution of the program code causes the computing device to perform operations according to any of embodiments 27-34.

41. A method implemented by a security service orchestration function (SSOF) in a communication infrastructure, that includes a plurality of public land mobile networks (PLMNs) and a plurality of enterprises, for orchestration of a security service level agreement (S-SLA), the method comprising:

receiving, by a home public land mobile network (HPLMN) of the plurality of PLMNs, an enterprise S-SLA request from a requesting enterprise, wherein the enterprise S-SLA request comprises a specific level of security attributes the requesting enterprise wants fulfilled in roaming situations;

performing capability mapping between the security attributes in the enterprise S-SLA request and a common security baseline capability template S-SLA of the HPLMN, wherein the common security baseline capability template S-SLA defines a common capability S-SLA offerable by the HPLMN;

offering the common capability S-SLA to the requesting enterprise for roaming situations in response to the common security baseline capability template S-SLA matching the security attributes in the enterprise S-SLA request; and receiving a response from the requesting enterprise, wherein the response comprises an acceptance or a decline of the common capability S-SLA.

42. The method of embodiment 41, further comprising:

checking security attributes of each visited public land mobile network (VPLMN) of the plurality of PLMNs to find a security capability matching the security attributes in the enterprise S-SLA request in response to the common security baseline capability template S-SLA not matching the security attributes in the enterprise S-SLA request; and negotiating a service specific roaming S-SLA with a particular VPLMN in response to finding a match between the security capability of the particular VPLMN and the security attributes in the enterprise S-SLA request.

43. The method of embodiment 42, further comprising:

offering the service specific roaming S-SLA to the requesting enterprise in response to negotiating the service specific roaming S-SLA with the particular VPLMN; and receiving a response from the requesting enterprise, wherein the response comprises an acceptance or a decline of the service specific S-SLA.

44. The method of any of embodiments 41-43 being repeated per enterprise, per service and per trust domain.

45. The method of any of embodiments 41-44, further comprising monitoring the common capability S-SLA or the service specific roaming S-SLA for compliance in response to being accepted by the requesting enterprise.

46. A computing device comprising:

processing circuitry; and memory coupled with the processing circuitry, wherein the memory includes instructions that when executed by the processing circuitry causes the computing device to, receive, by a home public land mobile network (HPLMN) of a plurality of public land mobile networks (PLMNs), an enterprise S-SLA request from a requesting enterprise, wherein the enterprise S-SLA request comprises a specific level of security attributes the requesting enterprise wants fulfilled in roaming situations;

perform capability mapping between the security attributes in the enterprise S-SLA request and a common security baseline capability template S-SLA of the HPLMN, wherein the common security baseline capability template S-SLA defines a common capability S-SLA offerable by the HPLMN;

offer the common capability S-SLA to the requesting enterprise for roaming situations in response to the common security baseline capability template S-SLA matching the security attributes in the enterprise S-SLA request; and receive a response from the requesting enterprise, wherein the response comprises an acceptance or a decline of the common capability S-SLA.

47. The computing device of embodiment 46, wherein the memory includes instructions that when executed by the processing circuitry causes the computing device to perform operations according to any of embodiments 42-45.

48. A computing device adapted to:

receive, by a home public land mobile network (HPLMN) of a plurality of public land mobile networks (PLMNs), an enterprise S-SLA request from a requesting enterprise, wherein the enterprise S-SLA request comprises a specific level of security attributes the requesting enterprise wants fulfilled in roaming situations;

perform capability mapping between the security attributes in the enterprise S-SLA request and a common security baseline capability template S-SLA of the HPLMN, wherein the common security baseline capability template S-SLA defines a common capability S-SLA offerable by the HPLMN;

offer the common capability S-SLA to the requesting enterprise for roaming situations in response to the common security baseline capability template S-SLA matching the security attributes in the enterprise S-SLA request; and receive a response from the requesting enterprise, wherein the response comprises an acceptance or a decline of the common capability S-SLA.

49. The computing device of embodiment 48 further adapted to perform according to any of embodiments 42-45.

50. A computer program comprising program code to be executed by processing circuitry of a computing device, whereby execution of the program code causes the computing device to perform operations according to any of embodiments 41-45.

51. A computer program product comprising a non-transitory storage medium including program code to be executed by processing circuitry of a computing device, whereby execution of the program code causes the computing device to perform operations according to any of embodiments 41-45.

Additional explanation is provided below.

The Security Service Orchestrator Function described herein includes one or more of the following features:

Embedding security specific orchestration capabilities into 5G and next generation service-based architecture in order to solve security concerns related to the deployment and configuration of the technology.

Introducing SSOF function to exchange security related information according to 3GPP SBA principles.

Coverage of security attributes is expanded from CIA to also address isolation, data sovereignty and MNO interworking.

Support for different security attributes and security capabilities for non-roaming and roaming cases.

Dynamic, common, and consistent S-SLA negotiation and handshake for PLMNs and enterprises.

Dynamic and optimized security capability mapping for roaming enterprise users to offer either common security baseline capabilities or service specific security capabilities.

Informing enterprises to which extent S-SLA requirements are possible to meet in roaming situations.

Real-time S-SLA compliance monitoring for S-SLA fulfillment for PLMNs and enterprises.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” includes any and all combinations of one or more of the associated listed items.

It will be understood that although the terms first, second, third, etc. may be used herein to describe various elements/ operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation “e.g.,” which derives from the Latin phrase “exempli gratia,” may be used to introduce or specify a general example or examples of a previously mentioned item, and is not intended to be limiting of such item. The common abbreviation “i.e.,” which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as “circuitry,” “a module” or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Abbreviations

At least some of the following abbreviations may be used in this disclosure. If there is an inconsistency between abbreviations, preference should be given to how it is used above. If listed multiple times below, the first listing should be preferred over any subsequent listing(s).

| Abbreviation | Explanation |
|---|---|
| AAA | Authentication, Authorization, Accounting |
| AES | Advanced Encryption Standard |
| CIA | Confidentiality, Integrity, Availability |
| CSP | Communications service provider |
| DSA | Digital Signature Standard |
| ECDSA | Elliptic Curve Digital Signature Algorithm |
| NF | Network Function |
| NE | Network Entity |
| OSS | Operations Support System |
| PLMN | Public Land Mobile Network |
| PSF | Physical Security Function |
| RSA | Rivest-Shamir-Adleman Pubic-Key Cryptosystem |
| SHA | Secure Hash Algorithms |
| S-SLA | Security Service Level Agreement |
| SSOF | Security Orchestration Function |
| TDES | Triple Data Encryption Algorithm |
| VSF | Virtual Security Function |

The invention claimed is:

1. A method implemented by a security service orchestration function (SSOF) in a communication infrastructure, that includes a plurality of public land mobile networks (PLMNs) and a plurality of enterprises serving a plurality end users, for orchestration of a security service level agreement (S-SLA), the method comprising:

receiving, by the SSOF in a home public land mobile network (HPLMN), a S-SLA request from one or more of the plurality of enterprises, wherein each S-SLA request comprises a plurality of requirements and wherein the HPLMN corresponds to one of the plurality of PLMNs and wherein each of the enterprises serves a plurality of end users;

performing capability mapping between the plurality of requirements of each S-SLA request and a common security baseline capability template S-SLA of the HPLMN to determine security attributes that the HPLMN is capable of providing;

converting, based on the capability mapping, each S-SLA request into a consistent and unified S-SLA offerable to each enterprise, wherein the consistent and unified S-SLA comprises security attributes that the HPLMN is capable of providing each of the enterprises;

offering the consistent and unified S-SLA to each enterprise that submitted the S-SLA request; and transforming each S-SLA request from the one or more enterprises into security policies and controls to be enforced within the HPLMN.

2. The method of claim 1, further comprising:

negotiating, by the SSOF in the HPLMN, fulfillment of the consistent and unified S-SLA with a SSOF in a visited public land mobile network (VPLMN) in roaming situations; and negotiating, by the SSOF in the HPLMN with a SSOF in another VPLMN, service specific S-SLA fulfillment in response to a requested S-SLA fulfillment being unachievable with the consistent and unified S-SLA.

3. The method of claim 1, further comprising capability mapping of supported security attributes for business services available in different VPLMNs to requested business services specific security attributes that the HPLMN is capable of providing the enterprises in their S-SLA requests.

4. The method of claim 1, further comprising providing capability mapping and optimization between HPLMN and VPLMN security attributes.

5. The method of claim 1, further comprising informing each enterprise of an extent to which S-SLA requirements are capable of being meet in roaming situations.

6. The method of claim 1, further comprising transmitting an S-SLA compliance monitoring request to the SSOF in each VPLMN.

7. The method of claim 1, further comprising:

receiving compliance monitoring requests from one or more enterprises and the SSOF in one or more VPLMNs; and transmitting an S-SLA compliance monitoring result to each enterprise and each SSOF from which the compliance monitoring request was received.

8. The method of claim 1, further comprising maintaining a capability data repository for common guaranteed security baselines in the HPLMN, the VPLMN, and service specific security baseline capabilities per PLMN, per enterprise.

9. The method of claim 1, wherein the SSOF in the HPLMN interacts with supporting security management functions to perform a set of functions comprising:

sending S-SLA information and security attribute information associated with a particular enterprise to the supporting security management functions;

receiving S-SLA compliance status reports on requested intervals and on demand in response to a request from the particular enterprise; and receiving S-SLA compliance violation reports in real-time.

10. A method implemented by a security service orchestration function (SSOF) in a communication infrastructure, that includes a plurality of public land mobile networks (PLMNs) and a plurality of enterprises, for orchestration of a security service level agreement (S-SLA), the method comprising:

transmitting, by a home public land mobile network (HPLMN) of the plurality of PLMNs, a S-SLA request to one or more visited public land mobile networks (VPLMNs) of the plurality of PLMNs to support specific business services with specific security attributes;

receiving a response from each VPLMN including a unique S-SLA including security attributes the VPLMN is capable of providing and based on the S-SLA request;

merging the security attributes received from each VPLMN into a common security baseline capability template S-SLA for communication to business services users or each of the enterprises;

receiving, by the HPLMN, an enterprise S-SLA request from a requesting enterprise of the plurality of enterprises, wherein the enterprise S-SLA request comprises a specific level of security attributes the requesting enterprise wants fulfilled in roaming situations;

performing capability mapping between the security attributes in the enterprise S-SLA request and the common security baseline capability template S-SLA of the HPLMN, wherein the common security baseline capability template S-SLA defines a common capability S-SLA offerable by the HPLMN to the enterprises;

offering the common capability S-SLA to the requesting enterprise for roaming situations in response to the common security baseline capability template S-SLA matching the security attributes in the enterprise S-SLA request; and receiving a response from the requesting enterprise, wherein the response comprises an acceptance or a decline of the common capability S-SLA.

11. The method of claim 10, further comprising exchanging between the PLMNs information security attributes and associated attribute value ranges that each PLMN can request from the other PLMNs.

12. The method of claim 10, further comprising providing, by the HPLMN, a catalogue to each enterprise of the plurality of enterprises serviced by the HPLMN, the catalogue comprising types of business services the HPLMN is capable of providing and that the enterprises can request from the HPLMN.

13. The method of claim 10, further comprising:

checking security attributes of each VPLMN to find a security capability matching the security attributes in the enterprise S-SLA request in response to the common security baseline capability template S-SLA not matching the security attributes in the enterprise S-SLA request; and negotiating a service specific roaming S-SLA with a particular VPLMN in response to finding a match between the security capability of the particular VPLMN and the security attributes in the enterprise S-SLA request.

14. The method of claim 13, further comprising:

offering the service specific roaming S-SLA to the requesting enterprise in response to negotiating the service specific roaming S-SLA with the particular VPLMN; and receiving a response from the requesting enterprise, wherein the response comprises an acceptance or a decline of the service specific S-SLA.

15. A method implemented by a security service orchestration function (SSOF) in a communication infrastructure, that includes a plurality of public land mobile networks (PLMNs) and a plurality of enterprises, for orchestration of a security service level agreement (S-SLA), the method comprising:

receiving, by a home public land mobile network (HPLMN) of the plurality of PLMNs, an enterprise S-SLA request from a requesting enterprise, wherein the enterprise S-SLA request comprises a specific level of security attributes the requesting enterprise wants fulfilled in roaming situations;

performing capability mapping between the security attributes in the enterprise S-SLA request and a common security baseline capability template S-SLA of the HPLMN, wherein the common security baseline capability template S-SLA defines a common capability S-SLA offerable by the HPLMN;

offering the common capability S-SLA to the requesting enterprise for roaming situations in response to the common security baseline capability template S-SLA matching the security attributes in the enterprise S-SLA request; and receiving a response from the requesting enterprise, wherein the response comprises an acceptance or a decline of the common capability S-SLA.

16. The method of claim 15, further comprising:

checking security attributes of each visited public land mobile network (VPLMN) of the plurality of PLMNs to find a security capability matching the security attributes in the enterprise S-SLA request in response to the common security baseline capability template S-SLA not matching the security attributes in the enterprise S-SLA request; and negotiating a service specific roaming S-SLA with a particular VPLMN in response to finding a match between the security capability of the particular VPLMN and the security attributes in the enterprise S-SLA request.

17. The method of claim 16, further comprising:

offering the service specific roaming S-SLA to the requesting enterprise in response to negotiating the service specific roaming S-SLA with the particular VPLMN; and receiving a response from the requesting enterprise, wherein the response comprises an acceptance or a decline of the service specific S-SLA.

18. The method of claim 15 being repeated per enterprise, per service and per trust domain.

19. The method of claim 15, further comprising monitoring the common capability S-SLA or the service specific roaming S-SLA for compliance in response to being accepted by the requesting enterprise.

* * * * *